United States Patent
Oishi et al.

(10) Patent No.: US 11,851,529 B2
(45) Date of Patent: *Dec. 26, 2023

(54) TRIAZINE RING-CONTAINING POLYMER, AND THERMOPLASTIC ARTICLE AND OPTICAL PART INCLUDING SAME

(71) Applicant: SAMSUNG ELECTRONICS CO., LTD., Suwon-si (KR)

(72) Inventors: Yoshiyuki Oishi, Morioka (JP); Eigo Miyazaki, Hwaseong-si (KR); Tomoyuki Kikuchi, Yokohama (JP); Yukika Yamada, Yokohama (JP)

(73) Assignees: SAMSUNG ELECTRONICS CO., LTD., Gyeonggi-Do (KR); NATIONAL UNIVERSITY CORPORATION IWATE UNIVERSITY, Morioka (JP)

(*) Notice: Subject to any disclaimer, the term of this patent is extended or adjusted under 35 U.S.C. 154(b) by 533 days.

This patent is subject to a terminal disclaimer.

(21) Appl. No.: 15/931,237

(22) Filed: May 13, 2020

(65) Prior Publication Data

US 2020/0362112 A1 Nov. 19, 2020

(30) Foreign Application Priority Data

May 13, 2019 (JP) .................. 2019-090993
May 13, 2019 (JP) .................. 2019-090994
May 11, 2020 (KR) ........... 10-2020-0056118

(51) Int. Cl.
*C08G 73/06* (2006.01)
*C08L 79/04* (2006.01)
*G02B 1/04* (2006.01)

(52) U.S. Cl.
CPC .......... *C08G 73/0644* (2013.01); *C08L 79/04* (2013.01); *G02B 1/04* (2013.01)

(58) Field of Classification Search
CPC ..... C08G 73/0644; C08G 75/04; C08L 79/04; G02B 1/04; H01L 51/0067; H01L 51/0072
See application file for complete search history.

(56) References Cited

U.S. PATENT DOCUMENTS

| 5,652,327 | A  | * | 7/1997  | Kang ........... G02F 1/3617 526/263 |
| 6,569,916 | B2 |   | 5/2003  | Kim |
| 8,618,243 | B2 |   | 12/2013 | Nishimura et al. |
| 8,710,174 | B2 |   | 4/2014  | Nishimura et al. |
| 9,562,137 | B2 |   | 2/2017  | Grate et al. |
| 2018/0215870 | A1 |   | 8/2018 | Nishimura et al. |
| 2018/0244915 | A1 | * | 8/2018 | Oishi ........... C08K 9/04 |

FOREIGN PATENT DOCUMENTS

| JP | 2002047345 A | 2/2002 |
| JP | 2009001658 A | 1/2009 |
| JP | 2012092261 A | 5/2012 |
| JP | 2014162829 A | 9/2014 |
| JP | 2014162830 A | 9/2014 |
| JP | 2015091919 A | 5/2015 |
| JP | 2016033230 A | 3/2016 |
| JP | 2018138625 A | 9/2018 |
| JP | 20200029544 A | 2/2020 |
| KR | 100379760 B1 | 4/2003 |
| KR | 100468399 B1 | 1/2005 |
| WO | 2010128661 A1 | 11/2010 |

OTHER PUBLICATIONS

You et al. (Macromolecules 2010, 43, 4613-4615).*
Fu et al. (Journal of Polymer Science, Part A: Polymer Chemistry 2018, 56, 724-731).*
Kim et al. (Kobunshi Ronbunshu, vol. 56, No. 3, pp. 159-165, Mar. 1999).*
Nakagawa et al. (Macromolecules 2011, 44, 9180-9186).*
English Translation of Office Action dated Feb. 7, 2023 issued in corresponding Japanese Patent Application No. 2019-090993, 9 pp.
Office Action dated Feb. 7, 2023 issued in corresponding Japanese Patent Application No. 2019-090993, 6 pp.

* cited by examiner

*Primary Examiner* — Shane Fang
(74) *Attorney, Agent, or Firm* — CANTOR COLBURN LLP

(57) ABSTRACT

A triazine ring-containing polymer including a structural unit represented by General Formula 1:

$$\text{*-[}A\text{-}B\text{-]-*}\qquad\text{General Formula 1}$$

wherein, in General Formula 1, A is represented by General Formula 2, B is represented by General Formula 3, and * indicates a point linked to another group or structural unit:

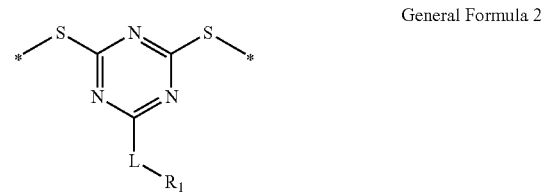

General Formula 2

$$\text{*---}[(CR_3R_4)_{m1}\text{--}R_2\text{---}(CR_5R_6)_{n1}]\text{---*}\qquad\text{General Formula 3}$$

wherein, in General Formula 2 and General Formula 3, L, $R_1$ to $R_6$, m1, n1, and * are the same as defined in the detailed description.

18 Claims, No Drawings

TRIAZINE RING-CONTAINING POLYMER, AND THERMOPLASTIC ARTICLE AND OPTICAL PART INCLUDING SAME

CROSS-REFERENCE TO RELATED APPLICATION

This application claims priority to and the benefit of Japanese Patent Application Nos. 2019-090993 and 2019-090994, filed in the Japanese Intellectual Property Office on May 13, 2019, and Korean Patent Application No. 10-2020-0056118, filed in the Korean Intellectual Property Office on May 11, 2020, and all the benefits accruing therefrom under 35 U.S.C. § 119, the entire contents of which are incorporated herein by reference.

BACKGROUND

1. Field

A triazine ring-containing polymer, and a thermoplastic resin and an article, and an optical part including the same are disclosed.

2. Description of the Related Art

Recently, research on optical materials has been actively conducted. Examples of the optical materials may be optical lens materials used in optical systems such as camera-containing devices including cameras, video cameras, vehicle-mounted cameras, or smartphone lenses. The optical lens materials are required to have a high refractive index and a high Abbe's number, and simultaneously have excellent heat resistance, light transparency, and easy molding properties. Compared with glass lenses, resin (polymer) lenses are light weight, do not easily break, and cost less in terms of materials, and thus may be formed into various shapes through an appropriate injection molding for lens formation. However, the thinner lenses necessary for high resolution cameras require a material having a high refractive index.

In order to obtain a polymer having a high refractive index as a resin material, attempts have been made to introduce an aromatic ring, a halogen atom, or a sulfur atom into the polymer. Particularly, an episulfide resin and a thiourethane resin prepared by introducing the sulfur atom can have a refractive index of greater than or equal to about 1.7 but lacks plasticity, which limits commercialization scope.

A triazine ring-containing polymer resin with a high refractive index and having high plasticity has been investigated. For example, Japanese Patent Laid-Open Publication No. 2014-162829 and Japanese Patent Laid-Open Publication No. 2014-162830 disclose a triazine ring-containing polymer including a repeating unit structure having a triazine ring, and having a refractive index of greater than or equal to about 1.7.

SUMMARY

However, the triazine ring-containing polymers disclosed in the prior art have a high glass transition temperature (Tg) and thus may be expected to exhibit higher thermal stability. However, the high glass transition temperature may bring about difficulties in molding processes such as injection molding and the like. On the contrary, the optical lens materials for an automotive camera and the like require much higher heat resistance.

Further, a triazine ring-containing polymer having a high refractive index, high transparency, and high thermal stability and simultaneously, being appropriate for a molding process such as injection molding and the like is being required.

The present inventors have discovered that a triazine ring-containing polymer having a particular repeating unit as disclosed herein can achieve these properties.

That is, the triazine ring-containing polymer according to an embodiment includes a structural unit represented by General Formula 1:

*-[$A$-$B$-]-*  General Formula 1

In General Formula 1,
A is represented by General Formula 2,
B is represented by General Formula 3, and
indicates a point linked to another group or structural unit:

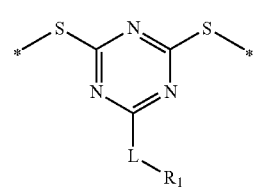

General Formula 2 wherein, in General Formula 2,
L is a single bond or a linking group,
$R_1$ is a group including an oxygen atom (O), sulfur atom (S), nitrogen atom (N), selenium atom (Se), or a combination thereof, and
indicates a point linked to another group or structural unit;

*-[—$(CR_3R_4)_{m1}$—$R_2$—$(CR_5R_6)_{n1}$—]-*  General Formula 3 wherein, in General Formula 3,
$R_2$ is a divalent aromatic hydrocarbon group, or an aromatic hydrocarbon linking group in which two or more aromatic hydrocarbon groups are linked to each other by an alkylene group, an oxygen atom (O), a sulfur atom (S), or a selenium atom (Se),
$R_3$ to $R_6$ are each independently a hydrogen atom, an alkyl group, or an aromatic hydrocarbon group,
m1 and n1 are independently 0 or 1, and
indicates a point linked to another group or structural unit.

The triazine ring-containing polymer according to an embodiment has a high refractive index, high transparency, and thermal stability due to a high glass transition temperature, and simultaneously, a part of linking groups thereof may be adjusted to decrease the glass transition temperature, and accordingly, the polymer may exhibit excellent thermoplasticity and thus be appropriate for a heat press and the molding process such as injection molding and the like.

DETAILED DESCRIPTION

Hereinafter, one or more exemplary embodiments will be described, but the technical scope of the present invention should be determined according to the description of the claims, and is not limited to the following embodiments. In this regard, the present embodiments may have different forms and should not be construed as being limited to the descriptions set forth herein. Accordingly, the embodiments are merely described below to explain aspects. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within 30%, 20%, 10%, 5% of the stated value.

As used herein, when a definition is not otherwise provided, the term "aromatic hydrocarbon group" refers to a cyclic group in which all ring members are carbon and at least one ring is aromatic, the group having the specified number of carbon atoms, for example a C6 to C30 arylene group, and specifically a C6 to C18 arylene group, and having a valence of at least one. More than one ring may be present, and any additional rings may be independently aromatic, saturated or partially unsaturated, and may be fused, pendant, spirocyclic, or a combination thereof.

As used herein, unless a special description is provided, each operation, measurement of physical properties, and the like is performed under conditions of room temperature (about 20° C. or higher, about 25° C. or lower) and a relative humidity (RH) of about 40% RH or higher and about 50% RH or lower.

As used herein, in the disclosure the term "triazine ring-containing polymer" may be simply referred to as "polymer," and the term "thermoplastic molded article" may also be simply referred to as "article."

In addition, as used herein, in the disclosure the term "divalent aromatic hydrocarbon linking group, or an aromatic hydrocarbon linking group in which two or more aromatic hydrocarbon groups are linked to each other by an alkylene group, an oxygen atom (O), a sulfur atom (S), or a selenium atom (Se)" may simply be referred to as "a divalent aromatic hydrocarbon group", or "an aromatic hydrocarbon group", or the like.

The triazine ring-containing polymer according to an embodiment includes a structural unit represented by General Formula 1:

*-[A-B-]-*  General Formula 1

In General Formula 1,
A (hereinafter, also referred to as "structural unit A") is represented by General Formula 2,
B (hereinafter, also referred to as 'structural unit B') is represented by General Formula 3, and
indicates a point linked to another structural unit or atom:

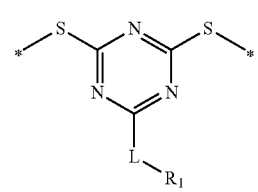

General Formula 2 wherein, in General Formula 2,
L is a single bond or a linking group,
$R_1$ is a group having oxygen atom (O), sulfur atom (S), nitrogen atom (N), selenium atom (Se), or a combination thereof, and
indicates a point linked to another structural unit or atom;

*-[—$(CR_3R_4)_{m1}$—$R_2$—$(CR_5R_6)_{n1}$—]-*  General Formula 3 wherein, in General Formula 3,
$R_2$ is a divalent aromatic hydrocarbon group, or an aromatic hydrocarbon linking group in which two or more aromatic hydrocarbon groups are linked to each other by an alkylene group, an oxygen atom (O), a sulfur atom (S), or a selenium atom (Se),
$R_3$ to $R_6$ are each independently a hydrogen atom, an alkyl group, or an aromatic hydrocarbon group,
m1 and n1 are independently 0 or 1, and
indicates a point linked to another structural unit or atom.

In the triazine ring-containing polymer according to an embodiment, as shown in General Formula 1, the triazine ring in the structural unit A and the structural unit B having a divalent aromatic hydrocarbon group are linked through a thioether bonds (—S—) to form a main chain of the polymer.

The polymer having the triazine ring in the main chain has a high refractive index and the refractive index of the polymer may be further improved by introducing the divalent aromatic hydrocarbon linking group into the main chain. In addition, it is considered that a glass transition temperature of the polymer may be increased by introducing the divalent aromatic hydrocarbon group into the main chain. That is, the triazine ring-containing polymer according to an embodiment may achieve both high refractive index and high glass transition temperature. This effect is greatly improved when the structural unit B is a divalent aromatic hydrocarbon linking group in which two or more aromatic hydrocarbon groups are linked through a sulfur atom (S). For example, the effect may be more greatly improved when structural unit B has the following thianthrene structure or diphenyl sulfide structure:

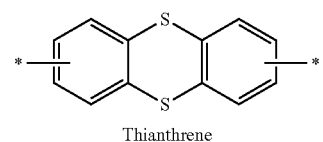

Thianthrene

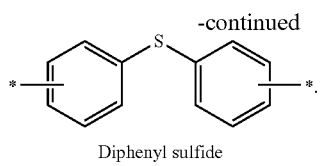

Diphenyl sulfide

The triazine ring-containing polymer according to an embodiment may have a rigid structure and a high glass transition temperature, so that environmental reliability may be increased. In addition, the triazine ring-containing polymer according to an embodiment has a large plasticity at a weight average molecular weight of 1,000,000 Daltons (Da) or less, and may be suitable for molding processes such as heat press and injection molding.

In addition, by introducing the divalent aromatic hydrocarbon group into the main chain, haze may be reduced by imparting solubility to the polymer or preventing gelation of the polymer.

On the other hand, in the structural unit B, that is, when at least one of m1 and n1 of General Formula 3 is 1, the triazine ring-containing polymer including the same may improve solubility in a solvent. Thereby, for example, purification by reprecipitation may be facilitated. In this case, the triazine ring-containing polymer according to an embodiment has large plasticity at a weight average molecular weight of 100,000 Da or less, and may secure fluidity during melting, and thus may be suitable for molding processes such as injection molding. In an embodiment, m1 and n1 of General Formula 3 may all be 1.

In General Formula 3, $R_3$ to $R_6$ may each independently be a hydrogen atom, a C1 to C30 alkyl group, or a C6 to C30 aromatic hydrocarbon group. For example, $R_3$ to $R_6$ of General Formula 3 may independently be a hydrogen atom, a C1 to C10 alkyl group, or a C6 to C30 aromatic hydrocarbon group.

That is, the triazine ring-containing polymer according to an embodiment has a high refractive index, a high glass transition temperature (Tg), exhibits thermoplasticity, and may be used in molding processes such as heat press and injection molding. Accordingly, the triazine ring-containing polymer according to an embodiment may be suitably used as optical lens materials used in optical systems such as various types of cameras including cameras and video cameras, and such as lenses for smartphones. In addition, the triazine ring-containing polymer of the embodiment may also be used as an optical part, such as a vehicle-mounted camera, which requires particularly high heat resistance.

In an exemplary embodiment, the triazine ring-containing polymer according to an embodiment may include the structural unit A represented by General Formula 2:

General Formula 2

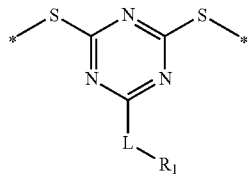

wherein, in General Formula 2, L is a single bond or a linking group. Herein, that L is a single bond means that the triazine and the substituent $R_1$ are directly linked. In addition, when L is a linking group, the linking group is not particularly limited as long as it does not impair the effects of the present disclosure. However, L may be a C1 to C6 alkylene group, for example, a methylene group, an ethylene group, a trimethylene group, a propylene group, an isopropylidene group, a tetramethylene group, a 2-methyltrimethylene group, a 1-methyltrimethylene group, a 1-ethylethylene group, a 1,2-dimethylethylene group, a 1,1-dimethylethylene group, or the like, a divalent C6 to C30 aromatic hydrocarbon group (e.g., a phenylene group, a naphthylene group. or the like), or an aromatic hydrocarbon linking group in which two or more C6 to C30 aromatic hydrocarbon groups are linked to each other by a single bond (e.g., a biphenylene group, a triphenylene group, or the like), an alkylene group, or an atom such as oxygen, sulfur, selenium, and the like. The C6 to C30 aromatic hydrocarbon groups in which two or more C6 to C30 aromatic hydrocarbon groups are linked to each other by an alkylene group, or an atom such as oxygen, sulfur, selenium, or the like may be represented by any one of the following chemical formulae:

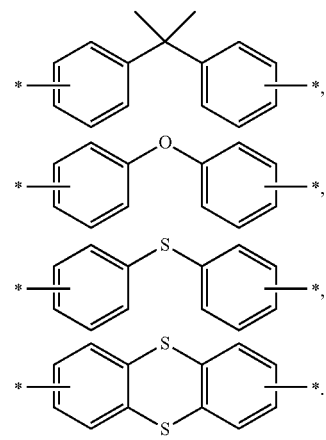

From the viewpoints of a refractive index, transparency, a glass transition temperature, solubility, and the like, L may be a single bond, a methylene group, an ethylene group, a phenylene group, a biphenylene group, a naphthalene group, or the like, among the above groups. For example, L may be a single bond, a methylene group, or a phenylene group, and for example, L may be a single bond.

In General Formula 2, $R_1$ represents a group including at least one atom that is an oxygen atom (O), a sulfur atom (S), a nitrogen atom (N), and a selenium atom (Se). Specific examples of $R_1$ are not particularly limited as long as they do not inhibit the effect of the present disclosure, but may be one of the groups represented by Formulae (4-1) to (4-8):

(4-1)

(4-2-1)

(4-2-2)

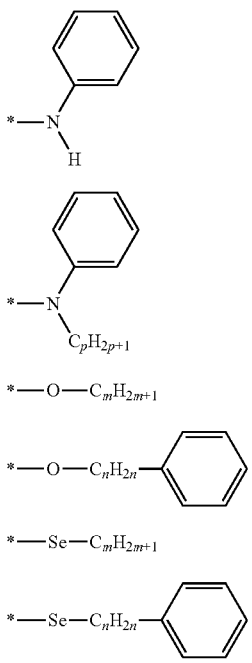

(4-3)

(4-4)

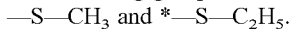

(4-5)

(4-6)

(4-7)

(4-8)

In Formulae (4-1), (4-5), and (4-7), m is independently an integer of 1 to 6. From the viewpoints of a refractive index, transparency, a glass transition temperature, solubility, and the like, m may be, for example, an integer of 1 to 3, for example, 1 or 2. In an embodiment, they may be represented by the following groups:

—S—CH$_3$ and *—S—C$_2$H$_5$.

In Formulae (4-2-2), (4-6), and (4-8), n is independently an integer of 1 to 6. From the viewpoints of a refractive index, transparency, a glass transition temperature, solubility, and the like, n may be, for example, an integer of 1 to 3, for example, 1 or 2. In an embodiment, R$_1$ may be represented by the following group:

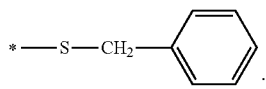

In Formula (4-4), p is an integer from 1 to 6. From the viewpoints of a refractive index, transparency, a glass transition temperature, solubility, and the like, p may be an integer from 1 to 5, for example 1 to 3, for example 1 or 2, and R$_1$ may be represented by any one of the following groups:

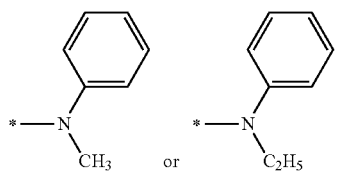

Among the groups, from the viewpoints of a refractive index, transparency, a glass transition temperature, solubility, and the like, R$_1$ may be, for example, a group represented by formulas (4-1) to (4-4). In other words, in an embodiment of the present disclosure, R$_1$ may be a group represented by any one of Formulae (4-1) to (4-4). For example, R$_1$ may be a group represented by any one of Formulae (4-1), (4-2-1), (4-2-2) and (4-4), for example, by Formula (4-1 or (4-2-2), and for example, the group may be represented by Formula (4-1).

In an embodiment, the group represented by General Formula 3 may be represented by General Formula 3-1:

General Formula 3-1

That is, General Formula 3-1 is the case that in General Formula 3, m1 and n1 are both 0.

In General Formula 3-1, as defined above, R$_2$ is the divalent aromatic hydrocarbon group, or an aromatic hydrocarbon linking group in which two or more aromatic hydrocarbon groups are linked to each other by an alkylene group, an oxygen atom (O), a sulfur atom (S), or a selenium atom (Se). Herein, the divalent aromatic hydrocarbon group is not particularly limited as long as it does not impair the effects of the present disclosure. The aromatic hydrocarbon constituting the divalent aromatic hydrocarbon group may be a non-condensed ring or a condensed ring. For example, it may be a divalent group derived from benzene, pentalene, indene, naphthalene, anthracene, azulene, heptalene, acenaphthalene, phenalene, fluorene, anthraquinone, phenanthrene, biphenyl, terphenyl, quaterphenyl, quinquephenyl, sexiphenyl, triphenylene, pyrene, chrysene, pycene, perylene, pentaphene, pentacene, tetraphene, hexaphene, hexacene, rubicene, trinaphthylene, heptapene, pyranthrene, or the like. Among these, benzene, naphthalene, biphenyl, and triphenyl may be used from the viewpoint of improving the refractive index and glass transition temperature (thermal stability), and examples thereof may include benzene and biphenyl.

In addition, when R$_2$ is the aromatic hydrocarbon linking group in which two or more aromatic hydrocarbon groups are linked to each other by an alkylene group, an oxygen atom (O), a sulfur atom (S), or a selenium atom (Se), the aromatic hydrocarbon group is not particularly limited as long as it does not inhibit the effect of the present disclosure. Since the specific examples thereof are the same as the examples in the case where R$_2$ is a divalent aromatic hydrocarbon group, the aromatic hydrocarbon group may be understood as disclosed above. Among these, from the viewpoint of improving the refractive index and glass transition temperature (thermal stability), a divalent aromatic hydrocarbon group derived from benzene or naphthalene, for example, a divalent group derived from benzene (phenylene group) may be used. In addition, in the above embodiment, the number of linked aromatic hydrocarbon groups is not particularly limited as long as the effect of the present disclosure is not impaired. From the viewpoint of improving the refractive index and glass transition temperature (thermal stability), the number of linked aromatic hydrocarbon groups may be 2 to 5. For example, the number of linked aromatic hydrocarbon groups may be 2 or 3, for example, 2.

In the above embodiment, the atom(s) linking the aromatic hydrocarbon groups is also not particularly limited as long as it does not impair the effects of the present disclosure. When R$_2$ is an aromatic hydrocarbon linking group in which two or more aromatic hydrocarbon groups are linked by an alkylene group, the alkylene group is not particularly limited. For example, the alkylene group may be a C1 to C6 linear or branched alkylene group such as a methylene group, an ethylene group, a trimethylene group, a propylene group, an isopropylidene group (—C(CH$_3$)$_2$—), a tetramethylene group, a 2-methyltrimethylene group, a 1-methyltrimethylene group, a 1-ethylethylene group, a 1,2-dimethylethylene group, or a 1,1-dimethylethylene group. Among these, from the viewpoint of improving the refractive index and glass transition temperature (thermal stability), the group or atom linking the aromatic hydrocarbon groups may be a C2 to C4 alkylene group, or an oxygen atom, or a sulfur atom. For example, the linking group or atom may be an isopropylidene group, or an oxygen atom or a sulfur atom, and in an embodiment, it may be a sulfur atom. For example, when $R_2$ is an aromatic hydrocarbon group in which two or more aromatic hydrocarbons are linked through a sulfur atom, the effect of improving the refractive index and glass transition temperature of the polymer may be further improved.

In the case where $R_2$ is a divalent aromatic hydrocarbon group, positions of the two bonds is not particularly limited. In an embodiment, the two bonds may be positioned at the most distant from each other. For example, if $R_2$ is a phenylene group, two sulfur atoms constituting the main chain may be bound to the para position of the phenylene group.

In an embodiment, $R_2$ may be any one of the following groups:

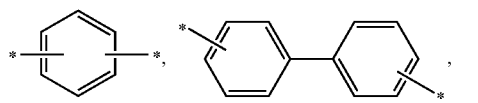

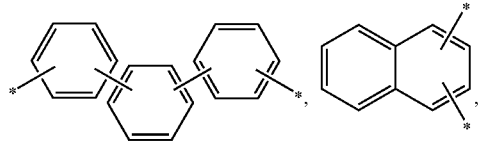

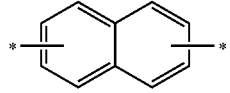

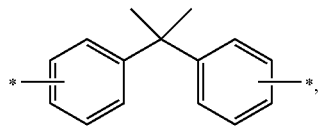

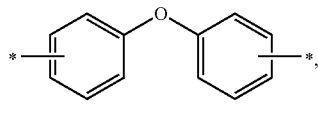

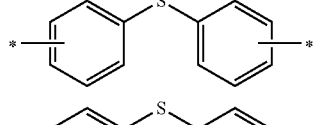
or

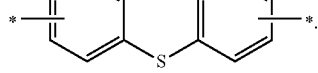

For example, $R_2$ may be any one of the following groups:

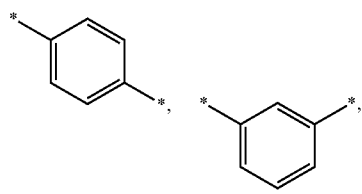

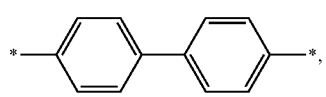

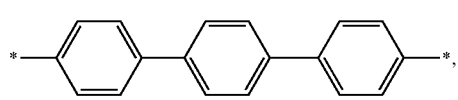

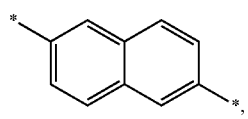

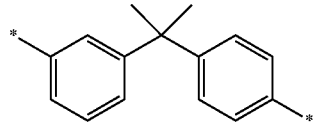

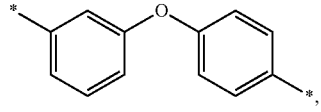

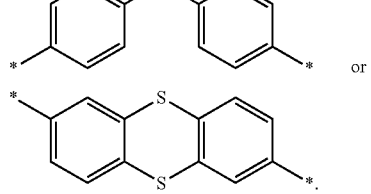 or

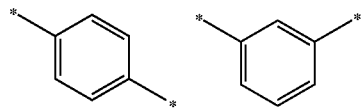

For example, $R_2$ may be any one of the following groups:

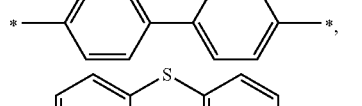

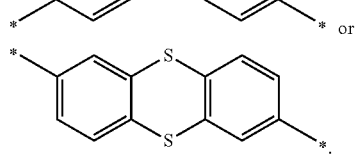 or

For example, $R_2$ may be any one of the following formulae:

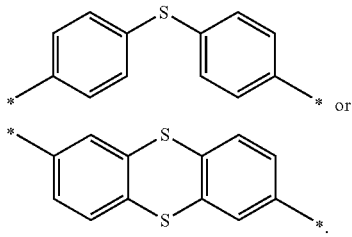

For example, $R_2$ may have the following structures. By including the following structures, the triazine ring-containing polymer according to an embodiment exhibits thermoplasticity, and thus may be more easily molded, for example by heat press and injection molding.

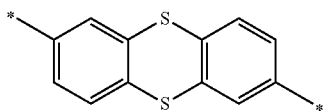

In addition, when the structure of $R_2$ in General Formula 2 is

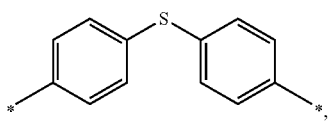

$R_1$ may have the following structure (tertiary amino group):

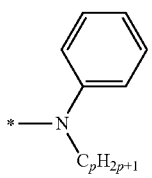

wherein, p may be an integer ranging from 1 to 6.

By including the above structure, the triazine ring-containing polymer according to an embodiment may further improve the refractive index and glass transition temperature.

In an embodiment, General Formula 3 may be represented by General Formula 3-2:

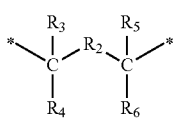

General Formula 3-2

In General Formula 3-2, $R_2$ is the same as defined in General Formula 3, and $R_3$ to $R_6$ are independently a hydrogen atom, an alkyl group, or an aromatic hydrocarbon group, * indicates a point linked to another structural unit or atom. That is, General Formula 3-2 represents a case where in General Formula 3, m1 and n1 are 1, respectively.

In $R_3$ to $R_6$ of the General Formula 3-2, the alkyl group and the aromatic hydrocarbon group are not particularly limited as long as the effects of the present invention are not impaired. The alkyl group may be, for example, C1 to C8 linear or branched alkyl group. For example, the alkyl group may be a methyl group, an ethyl group, a n-propyl group, an isopropyl group, a n-butyl group, an isobutyl group, a sec-butyl group, a tert-butyl group, a n-pentyl group, an isopentyl group, a tert-pentyl group, a neopentyl group, a 1,2-dimethylpropyl group, a n-hexyl group, an isohexyl group, a 1,3-dimethylbutyl group, a 1-isopropylpropyl group, a 1,2-dimethylbutyl group, a n-heptyl group, a 1,4-dimethylpentyl group, a 3-ethylpentyl group, a 2-methyl-1-isopropylpropyl group, a 1-ethyl-3-methylbutyl group, a n-octyl group, a 2-ethylhexyl group, a 3-methyl-1-isopropylbutyl group, a 2-methyl-1-isopropyl group, a 1-tert-butyl-2-methylpropyl group, and the like. In addition, the aromatic hydrocarbon group may be, for example, a monovalent group derived from benzene, pentalene, indene, naphthalene, anthracene, azulene, heptane, acenaphthylene, phenalene, fluorene, anthraquinone, phenanthrene, biphenyl, terphenyl, quaterphenyl, quinquephenyl, sexiphenyl, triphenylene, pyrene, chrysene, pycene, perylene, pentaphene, pentacene, tetraphene, hexaphene, hexacene, rubicene, trinaphthalene, heptaphene, pyranthrene, and the like. Among these, from the viewpoints of refractive index, transparency, glass transition temperature, solubility and the like, $R_3$ to $R_6$ may independently be a hydrogen atom, a methyl group, or a phenyl group, and in an embodiment, it may be, for example, a hydrogen atom or a methyl group.

The triazine ring-containing polymer according to an embodiment may have one structural unit A, or two or more structural units A. From the viewpoint of improving the refractive index, the triazine ring-containing polymer may have 2 to 5 structural units A, and in an embodiment, 2 structural units A. In other words, each structural unit A may be the same or different.

Similarly, the triazine ring-containing polymer according to an embodiment may have one structural unit B, or two or more structural units B. From the viewpoint of ease of control of the refractive index and the glass transition temperature, the triazine ring-containing polymer may have one type of structural unit B, or two or more types of structural unit B, for example, one type of structural unit B or two types of structural units B. In other words, each structural unit B may be the same or different.

That is, in an embodiment, the triazine ring-containing polymer may include structural units represented by General Formula (1-1), and structural units represented by General Formula (1-2):

*-[A'B-]-*     (1-1)

*-[A"B-]-*     (1-2).

In General Formulae (1-1) and (1-2), A' and A" are each independently the same as definition of A in General Formula (1), but A' and A" are different from each other (i.e., the structure of A' and the structure of A" are different from each other, and both A' and A" are included as the structural units A in the polymer). In General Formulae (1-1) and (1-2), B is the same as the definition of B in General Formula (1), wherein B in General Formulae (1-1) and (1-2) may be the same (i.e., the structures of B in General Formulae (1-1) and (1-2) may be the same).

The triazine ring-containing polymer according to an embodiment essentially includes a structural unit including at least one structural unit A and at least one structural unit B described above. Herein, the polymer may include 2 to 5 different structural units A and/or 2 to 5 different structural units B. Through such a configuration, solubility of the polymer in a solvent may be improved and haze may be reduced. The haze of the polymer decreases as a result of the improved solubility of the polymer, making it easier to remove impurities such as monomers and oligomers when purifying the solvent. For example, the triazine ring-containing polymer according to an embodiment may include two different structural units A and/or two different structural units B.

The triazine ring-containing polymer according to an embodiment may include a structural unit represented by General Formula (1-3), and a structural unit represented by General Formula (1-4):

$$*\text{-}[A\text{-}B'\text{-}]\text{-}* \quad (1\text{-}3)$$

$$*\text{-}[A\text{-}B''\text{-}]\text{-}* \quad (1\text{-}4).$$

In General Formulae (1-3) and (1-4), A is represented by General Formula (2), and B' (hereinafter, also referred to as "structural unit B'") and B" (hereinafter also referred to as "structural unit B''") are each independently represented by General Formula (3), wherein B' and B" are different from each other.

In General Formulae (1-3) and (1-4), A is the same as definition of A in General Formula (1), wherein A of General Formulae (1-3) and (1-4) are the same (i.e., the structures of A in General Formulae (1-3) and (1-4) are the same). Further, B' and B" are each independently the same as the definition of B in General Formula (1), but B' and B" are different from each other (i.e., Although the structures of B' and B" are different from each other, both B' and B" are included in the structural units B of the polymer).

In addition, the triazine ring-containing polymer according to an embodiment may include one or more of a repeating unit represented by General Formula (1-5), a structural unit represented by General Formula (1-6), a structural unit represented by General Formula (1-7), and a structural unit represented by represented by General Formula (1-8):

$$*\text{-}[A'\text{-}B'\text{-}]\text{-}* \quad (1\text{-}5)$$

$$*\text{-}[A''\text{-}B'\text{-}]\text{-}* \quad (1\text{-}6)$$

$$*\text{-}[A'\text{-}B''\text{-}]\text{-}* \quad (1\text{-}7)$$

$$*\text{-}[A''\text{-}B''\text{-}]\text{-}* \quad (1\text{-}8).$$

In General Formulae (1-5), (1-6), (1-7), and (1-8), A' and A" are each independently represented by General Formula (2), wherein A' and A" are different from each other, and B' and B" are each independently represented by General Formula (3), wherein B' and B" are different from each other.

That is, in General Formulae (1-5), (1-6), (1-7), and (1-8), A' and A" are each independently the same as the definition of A of General Formula (1), A' and A" are different from each other (i.e., the structure of A' is different from that of A", but both A' and A" are included in the structural unit A). In addition, B' and B" are each independently the same as the definition of B in General Formula (1), but B' and B" are different from each other (i.e., the structure of B' is different from the structure of B", but both B' and B" are included in the structural unit B).

In General Formulae (1-1) to (1-8), since "-A'-" and "-A"-" are each independently the same as the definition of General Formula (2) except that A' and A" are different structures, additional description thereof is not provided herein. Similarly, in General Formulae (1-1) to (1-8), since "-B'-" and "—B"-" are each independently the same as the definition of General Formula (3) except that B 'and B" are different structures, additional description thereof is not provided herein.

As used herein, the structural unit of "-A'-" is also simply referred to as "structural unit A'."

The structural unit of "-A"-" is also simply referred to as "structural unit A"."

Similarly, the structural unit of "—B'-" is also simply referred to as "structural unit B."

The structural unit of "—B"-" is also simply referred to as "structural unit B"."

As described above, the polymer including two or more and five or less different structural units A and/or two or more and five or less different structural units B may exhibit excellent solubility in solvents. For this reason, it is desirable, for example, during purification by reprecipitation.

In addition, in an embodiment including two or more and five or less different structural units A, at least one of the two or more structural units A may be, for example, represented by General Formulae (4-1), (4-2-1), (4-2-2), or (4-4). For example, A may be selected from groups represented General Formulae (4-1) and (4-2-2), or A may be selected from groups represented by General Formula (4-1). The effect of further improving the refractive index may be exhibited by selecting at least one of the two or more and five or less structural units A from the above groups.

When the triazine ring-containing polymer includes the structural unit A' and the structural unit A", a combination of the structural unit A' and the structural unit A" is not particularly limited as long as it does not impair the effects of the present disclosure. From the viewpoints of improving refractive index, glass transition temperature, and solubility, the structural unit A' may be for example a group in which $R_1$ in General Formula (2) is represented by the following formulae:

Alternatively, the structural unit A" may be a group in which $R_1$ of General Formula 2 is represented by the following formulae:

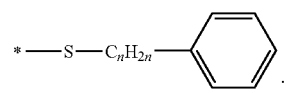

In an embodiment, the structural unit A' may be a group in which $R_1$ in General Formula (2) is represented by the following formulae:

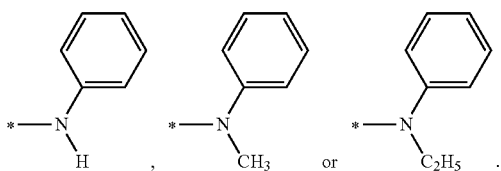

Alternatively, in another embodiment, the structural unit A" may be a group in which $R_1$ of General Formula (2) is represented by the following formulae:

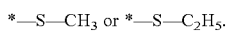

*—S—CH$_3$ or *—S—C$_2$H$_5$.

In another embodiment, the structural unit A' may be a group in which R1 in General Formula (2) is represented by the following formulae:

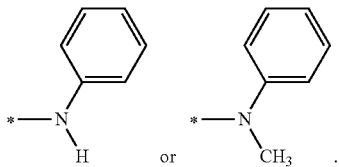

Alternatively, in another embodiment, the structural unit A" may be a group in which $R_1$ of General Formula (2) is represented by the following formula:

*—S—CH$_3$.

In the above embodiments, a content ratio of the structural unit A' and the structural unit A" is not particularly limited as long as it does not impair the effects of the present disclosure. From the viewpoint of improving the refractive index and glass transition temperature and solubility, the content ratio (mole ratio) of the structural unit A' and the structural unit A" in the polymer may be about 5 to 95:95 to 5, for example, about 20 to 50:80 to 50 when the total number of the structural unit A' and the structural unit A" is 100. Further, the structural unit A' may be represented by any one of Formulae (1-1), (1-5), or (1-7), wherein $R_1$ is —N(phenyl group)(hydrogen atom or alkyl group), and the structural unit A" may be represented by any one of Formulae (1-2), (1-6), or (1-8), wherein $R_1$ is —S(alkyl group) or —S-(alkylene group)-(phenyl group).

When the triazine ring-containing polymer includes the structural unit B' and the structural unit B", a combination of the structural unit B' and the structural unit B" is not particularly limited as long as it does not impair the effects of the present disclosure. From the viewpoint of improving refractive index, solubility, and the like, the structural unit B' may be a group in which $R_2$ in General Formula (3) is represented by the following formula:

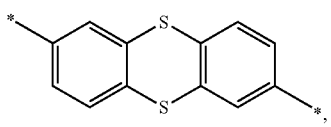

and
the structural unit B" may be a group in which $R_2$ in General Formula (3) is represented by the following formula:

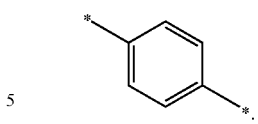

Alternatively, the structural unit B" may be a group in which $R_2$ in General Formula (3) is represented by the following formula:

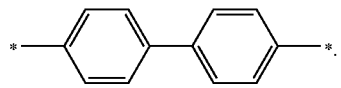

In the above embodiments, a molar ratio of the structural unit B' and the structural unit B" is not particularly limited as long as it does not impair the effects of the present disclosure. From the viewpoint of improving the refractive index, solubility, and the like, the molar ratio of the structural units B' and structural units B" may be, for example, about 20 to 60:80 to 40, for example, about 30 to 50:70 to 50 when the total number of structural units B' and constituent units B" is 100. Further, the structural unit B' may be represented by any one of Formulae (1-3), (1-5), or (1-6), wherein $R_2$ is a phenylene group, and the structural unit B" may be represented by any one of Formulae (1-4), (1-7), or (1-8) wherein $R_2$ is a para-biphenylene group.

The triazine ring-containing polymer according to an embodiment may include structural units (hereinafter, also referred to as "other structural units") other than the structural unit represented by General Formula 1. However, in an embodiment, other structural units may not be included. Even if other structural units are included, a molar ratio of the number of other structural units relative to the total number of structural units may be less than or equal to about 10 mole percent (mol %). For example, a content of other structural units may be less than or equal to about 5 mol %, for example less than or equal to about 3 mol %, less than or equal to about 1 mol %, or 0 mol %. When the molar ratio of the other structural units is within the above range, reduction of the refractive index of the polymer and the difficulty in molding processes such as heat press and injection molding may be prevented.

When the triazine ring-containing polymer includes two or more structural units, that is, it is a copolymer, the arrangement form of the structural units is not particularly limited. The arrangement may have a block form (block copolymer), a random form (random copolymer), or an alternate form (alternating copolymer).

The triazine ring-containing polymer according to an embodiment has a high refractive index and a high glass transition temperature. That is, in an embodiment, the triazine ring-containing polymer may have a refractive index ($n_d$) of greater than or equal to about 1.70, and a glass transition temperature (Tg) of greater than or equal to about 100° C. For example, the triazine ring-containing polymer according to an embodiment may have a refractive index ($n_d$) of greater than or equal to about 1.74, and a glass transition temperature of greater than or equal to about 110° C.

The triazine ring-containing polymer according to an embodiment may have a refractive index ($n_d$) of, for example, greater than or equal to about 1.68 greater than or equal to about 1.7, greater than or equal to about 1.72, or greater than or equal to about 1.73, but is not limited thereto.

The triazine ring-containing polymer according to an embodiment may have an Abbe's number ($v_d$) of, for example greater than or equal to about 15, greater than or equal to about 17, greater than or equal to about 18, or greater than or equal to about 19, but is not limited thereto.

The triazine ring-containing polymer may have a haze of, for example less than or equal to about 5, less than or equal to about 4.5, or less than or equal to about 4, but is not limited thereto.

When the refractive index ($n_d$), Abbe's number ($v_d$), and haze are within the above ranges, an article having a high refractive index suitable for optical parts may be obtained. As used herein, the values measured by the method described in examples below are used for the refractive index ($n_d$), Abbe's number ($v_d$), and haze.

The triazine ring-containing polymer according to an embodiment has a glass transition temperature. That is, an inflection point is observed in a differential calorimeter curve by differential scanning calorimetry. The resin having the glass transition temperature in this way has thermoplasticity and may be processed by injection molding. The glass transition temperature of the triazine ring-containing polymer may be greater than or equal to about 80° C. and less than or equal to about 190° C., for example, greater than or equal to about 90° C. and less than or equal to about 160° C., for example, greater than or equal to about 100° C. and less than or equal to about 140° C. The glass transition temperature may be adjusted by controlling the structures of the structural units A and/or structural units B. For example, by introducing a bulky structure and a rigid structure to one or more of $R_1$ groups in General Formula (2) and/or $R_2$ and/or $R_3$ to $R_6$ in General Formula (3), the glass transition temperature may be increased. As used herein, the Tg values measured by the method described in the examples below are used for the glass transition temperature.

The weight average molecular weight (Mw) of the triazine ring-containing polymer according to an embodiment may be greater than about 5,000 Dalton (Da) and less than or equal to about 1,000,000 Da, for example, greater than or equal to about 7,000 Da and less than or equal to about 500,000 Da, greater than or equal to about 10,000 Da and less than or equal to about 100,000 Da, or greater than or equal to about 10,000 Da and less than or equal to about 100,000 Da. When the weight average molecular weight is within the above numerical range, the transmittance (transparency) and heat resistance of the article may be improved, and the mechanical strength of the article is also improved. The method of controlling the weight average molecular weight within the above numerical range is not particularly limited, but a method of controlling the polymerization reaction time may be used. As used herein, the value measured by the method described in the examples below is used for the weight average molecular weight values.

The viscosity in a molten state of the triazine ring-containing polymer according to an embodiment may be, for example, greater than or equal to about 100 pascal seconds (Pa·s) and less than about 100,000 Pa·s, for example greater than or equal to about 1,000 Pa·s and less than or equal to about 50,000 Pa·s, greater than or equal to about 6,000 Pa·s and less than or equal to about 30,000 Pa·s. If the viscosity in the molten state is within the above numerical range, molding processability such as heat press and injection molding may be improved. As used herein, values measured by the method described in examples below are used for the viscosity in the molten state of the polymer.

The triazine ring-containing polymer according to an embodiment may have excellent solubility in a solvent, and may be, for example, dissolved at a concentration of greater than or equal to about 1 mass % in two or more different solvents. Herein, examples of the solvents include N-methyl-2-pyrrolidone (NMP), tetrahydrofuran (THF), chloroform, and cyclohexanone. Among these, the polymer may be dissolved at a concentration of greater than or equal to about 1 mass % in each of two solvents that are N-methyl-2-pyrrolidone (NMP), tetrahydrofuran (THF), chloroform, or cyclohexanone. For example, the polymer may be dissolved at a concentration of greater than or equal to about 1 mass %, in N-methyl-2-pyrrolidone (NMP) and tetrahydrofuran (THF), respectively.

The triazine ring-containing polymer according to an embodiment may be prepared by reacting a dihalogenated (e.g., dichlorolated) triazine compound with a dimercapto aromatic compound in the presence of a phase transfer catalyst.

The dihalogenated triazine compound is not particularly limited and may be appropriately selected in consideration of the structure of the structural unit A. For example, the dihalogenated triazine compound may be 2-anilino-4,6-dichlorotriazine [2-anilino-4,6-dichloro-1,3,5-triazine], 2-(N-methylanilino)-4,6-dichlorotriazine [2-(N-methylanilino)-4,6-dichloro-1,3,5-triazine], 2-(N-ethylanilino)-4,6-dichlorotriazine [2-(N-ethylanilino)-4,6-dichloro-1,3,5-triazine], 2,4-dichloro-6-phenylsulfanyl-1,3,5-triazine, 2-benzyl sulfanyl-4,6-dichloro-1,3,5-triazine, 2-methylthio-4,6-dichloro-1,3,5-triazine, 2-ethylthio-4,6-dichloro-1,5-triazine, or the like, but is not limited thereto.

In addition, the dimercapto aromatic compound is not particularly limited and may be appropriately selected in consideration of the structure of the structural unit B. For example, the dimercapto aromatic compound may be 2,6-thianthrene dithiol, 2,7-thianthrene dithiol, 1,2-benzene dithiol, 1,3-benzene dithiol, 1,4-benzene dithiol, 4,4'-biphenyldithiol, 4,4'-thiobisbenzene thiol, 2,6-naphthalene dithiol, 4,4'-oxybisbenzene thiol, or the like, but is not limited thereto. The dimercapto aromatic compounds may be used alone or in a combination of two or more.

The phase transfer catalyst used for the reaction between the dihalogenated triazine compound and the dimercapto aromatic compound may be a long-chain alkyl quaternary ammonium salt, a crown ether, or the like that may be used for interfacial polycondensation, and it may be, for example, hexadecyltrimethylammonium bromide. A mixing ratio of the dihalogenated triazine compound and the dimercapto aromatic compound is a ratio that they become approximately equimolar in general stoichiometry.

The reaction system may be a two-phase system of water and an organic solvent, and an organic solvent such as chloroform, dichloromethane, benzonitrile, and nitrobenzene, and water may be used as the two-phase system. During the reaction, bases such as sodium hydroxide and potassium hydroxide may be added to react them at greater than or equal to about −10° C. and less than or equal to about 100° C. for greater than or equal to about 1 hour and less than or equal to about 120 hours. Moreover, the said operation may be performed while stirring.

Alternatively, the triazine ring-containing polymer according to an embodiment may be synthesized using a known method. For example, as shown in Reaction Scheme 1, it may be prepared by reacting a triazine dithiol compound and an aromatic compound having a leaving group in the presence of a phase transfer catalyst:

Reaction Scheme 1

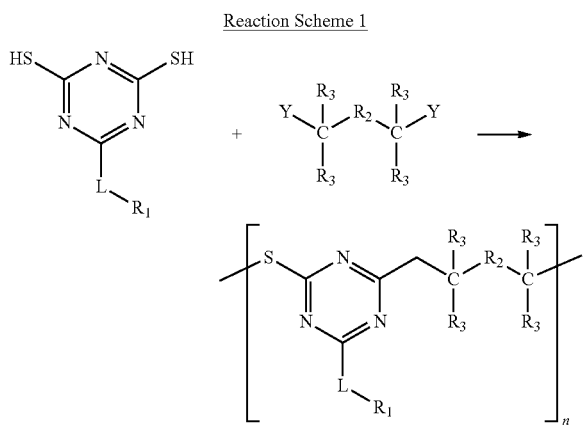

In Reaction Scheme 1, $R_1$ is the same as the definition in General Formula (2), $R_2$ and $R_3$ are the same as the definition in General Formula (3-2), and Y represents a leaving group such as a halogen atom.

Examples of Y may include a fluorine atom, a chlorine atom, a bromine atom, an iodine atom, a tosyl group (p-toluenesulfonyl group), a trifluorate group (trifluoromethylsulfonyl group), and a nitro group, but are not limited thereto.

The triazine dithiol compound is not particularly limited, but may be, for example, 2-methylthio-1,3,5-triazine-4,6-dithiol, 2-ethylthio-1,3,5-triazine-4,6-dithiol, 2-benzylthio-1,3,5-triazine-4,6-dithiol, 2-(2'-phenylethylthio)-1,3,5-triazine-4,6-dithiol, 2-anilino-1,3,5-triazine-4,6-dithiol, 2-(N-methylanilino)-1,3,5-triazine-4,6-dithiol, and the like. Examples of the aromatic compound having the leaving group may include α,α'-dibromo-p-xylene, α,α'-dichloro-p-xylene, α,α'-dibromo-o-xylene, α,α'-dichloro-o-xylene, α,α'-dibromo-m-xylene, α,α'-dichloro-m-xylene, 4,4'-bis(bromomethyl)biphenyl, 4,4'-bis(chloromethyl)biphenyl, α,α'-ditosylate-p-xylene, or the like, but are not limited to thereto. The triazine dithiol compounds may be used alone or in a combination of two or more.

The phase transfer catalyst used for the reaction between the triazine dithiol compound and the aromatic compound including the leaving group may be a long-chain alkyl quaternary ammonium salt, a crown ether, or the like that may be used for interfacial polycondensation, and may be, for example, tetrabutylammonium bromide, hexadecyl trimethylammonium bromide, and the like.

The reaction system may be a two-phase system of water and an organic solvent, and organic solvents such as chloroform, dichloromethane, benzonitrile, and nitrobenzene, and water may be used as the two-phase system. During the reaction, bases such as sodium hydroxide and potassium hydroxide may be added to react them to react them at greater than or equal to about −10° C. and less than or equal to about 100° C. for greater than or equal to about 1 hour and less than or equal to about 120 hours.

The triazine ring-containing polymer obtained through the above methods may be purified by a general purification method such as a reprecipitation method, a dialysis method, an ultrafiltration method, and an extraction method. Further, the obtained triazine ring-containing polymer is dried at room temperature to about 120° C. under vacuum, for example, in order to completely remove the remaining solvent included in the polymer. In this way, the refractive index and the like are evaluated using the polymer in which the remaining solvent is completely removed.

Thermoplastic Article and Optical Parts

Another embodiment provides a thermoplastic molded article including the triazine ring-containing polymer. Another embodiment provides an optical part comprising the triazine ring-containing polymer.

A shape of the article is not particularly limited but any type, for example, lens-type (spherical lens, nonspherical lens, fresnel lens, and the like), film-type, sheet-type, plate-type, bar-type, fiber-type, prism-type, and the like. The article may be manufactured, for example, in a well-known method such as an injection molding method, a compression molding method, an extrusion method, a transfer method, a blow method, a pressure method, a coating method (a spin coating method, a roll coating method, a curtain coating method, a dip coating method, a casting method, and the like) and the like. Among them, the polymer according to the embodiment may be used in an injection molding. Before forming the article, a kneading apparatus such as a Henschel mixer, a kneader, a banbury mixer, an extruder, and the like may be used to mix raw materials. When the injection molding is adopted, a cylinder temperature may be, for example, greater than or equal to about 150° C. and less than or equal to about 300° C. and a molding temperature of greater than or equal to about 50° C. and less than or equal to about 100° C.

The optical part may be appropriately used as an optical part transmitting light (a passive optical part) in a display (for example, a display for a smart phone, a liquid crystal display, a plasma display, and the like), an imaging system (for example, a camera, a video, and the like), an optical pickup, a projector, an optical fiber communication equipment (for example, an optical amplifier and the like), a head lamp for a vehicle, and the like. These optical parts may include, for example, lens, a film, an optical waveguide, a prism, a prism sheet, a panel, an optical disk, a sealant of LED, and the like. These optical parts may have, if necessary, various functional layers such as an anti-reflection layer, a light absorption layer, a hard coating layer, an antiglare layer, and the like.

EXAMPLES

Hereinafter, exemplary aspects of the present disclosure will be described in detail with reference to examples, but the present disclosure is not limited to the aspects of the following examples.

In the following examples, "parts" indicates "parts by weight" unless it is particularly specified otherwise.

Measurement Methods of Property

Number average molecular weight ($M_n$) and Weight average molecular weight ($M_w$)

The number average molecular weight ($M_n$) and the weight average molecular weight ($M_w$) of the polymer were measured by the following method.

A measurement sample was prepared by dissolving a polymer in N-methyl-2-pyrrolidone (NMP) to a concentration of 0.1 weight percent (wt %) and filtering the solution with a polytetrafluoroethylene membrane filter having a bore diameter of 0.2 micrometers (μm). A number average molecular weight and a weight average molecular weight of the sample were measured through gel permeation chromatography (GPC) using tetrahydrofuran as a mobile phase with a differential refractometer as a detector. Monodisperse polystyrene was used as a standard material of a molecular weight.

Glass Transition Temperature ($T_g$)

The glass transition temperature ($T_g$) of the polymer was measured by the following method.

A glass transition temperature ($T_g$) of the sample was measured with a differential scanning calorimeter (DSC) by increasing a temperature to about 300° C. at a temperature increase rate of about 10° C./min, maintaining the sample at this temperature for about 10 minutes, cooling to about 25° C. at a rate of about 10° C./min, maintaining at that temperature for about 10 minutes, and then, increasing the temperature to about 300° C. at a temperature increase rate of about 10° C./min. After the measurement was complete, the sample was cooled to room temperature (about 25° C.) at rate of about 10° C./min.

Refractive Index ($n_d$) and Abbe's Number ($v_d$)

A refractive index ($n_d$) and an Abbe number ($v_d$) of the polymer were measured in the following method.

After the polymerization reaction, the reaction solution is added dropwise to excess isopropyl alcohol and reprecipitated to purify the polymer, and this specimen (solid) is dried at 100° C. under vacuum for 48 hours. 2 g of example polymer were then compression-molded for 5 minutes under conditions of 200° C. and 10 megapascal (MPa), and a molded plate having a length of 3 centimeters (cm), a width of 3 cm, and a thickness of 0.5 millimeters (mm) was manufactured. A refractive index of the molded plate at a wavelength of about 473 nanometers (nm), about 594 nm, and about 657 nm was measured with a prism coupler (Model 2010, Metricon Corp.). The measured values were used to calculate a refractive index at a C-ray (about 656.3 nm), a d-ray (about 587.6 nm), and an F-ray (about 486.1 nm). The refractive index at these three wavelengths were used to calculate the Abbe's number ($v_d$) according to Equation 1:

$$(v_d)-[(n_d-1)/(n_F-n_C)] \quad \text{Equation 1}$$

wherein $n_d$ is a refractive index about the d-ray, $n_F$ is a refractive index about the F-ray, $n_C$ is a refractive index about the C-ray. Among these values, a refractive index at the d-ray (587.6 nm) is commonly regarded as a refractive index ($n_d$).

Haze

Haze was measured using a molded plate manufactured to have the specified "refractive index ($n_d$) and the Abbe's number ($v_d$)" with a haze meter NDH5000 (Suga Test Instruments Co., Ltd.).

Measurement of Rheology

Viscosity of the polymer in a molten state was measured by using a Rheometer (MCR302, Anton Paar GmbH) at 250° C. under a nitrogen atmosphere at a shear rate of 0.1 inverse seconds (1/s).

Solubility Test

A polymer was weighed and put in a 20 milliliter (mL) screw vial, and solvents (N-methyl-2-pyrrolidone (NMP), tetrahydrofuran (THF), chloroform) were added thereto, and then the contents were stirred at room temperature (25° C.) for 3 hours. Subsequently, whether or not the polymer remained in the solution and whether or not the polymer was suspended was determined by visual appearance, and a solubility test was performed.

In addition, as for the polymer having solubility of less than 1 mg/mL at room temperature (25° C.), the solubility test was performed at 80° C. in the same method as above.

Synthesis of Triazine Ring-Containing Polymer 1

Example 1

2-methylthio-1,3,5-triazine-4,6-dithiol (MA-1, 500 mg, 2.6 mmol) as put in a 20 mL beaker, 2 mL of pure water as added thereto, and then, 0.53 mL of a 10 M NaOH aqueous solution was added thereto. Separately, α,α'-dichloro-p-xylene (MB-1) (460 mg, 2.6 mmol) was dissolved in 2 mL of chloroform and then, was added to the aqueous solution. 50 mg of hexadecyl trimethyl ammonium bromide was added thereto and then, fervently stirred at room temperature (25° C.) for 24 hours. The reaction solution was added dropwise in methanol and reprecipitated and then filtered, and a filtrate therefrom was dried at 100° C. under vacuum for 48 hours to obtain a white triazine ring-containing polymer (P-1). A number average molecular weight of the obtained polymer is 35,000 Da, and a weight average molecular weight thereof is 80,000 Da. In addition, viscosity of the triazine ring-containing polymer (P-1) in a molten state is less than 16,000 Pa·s.

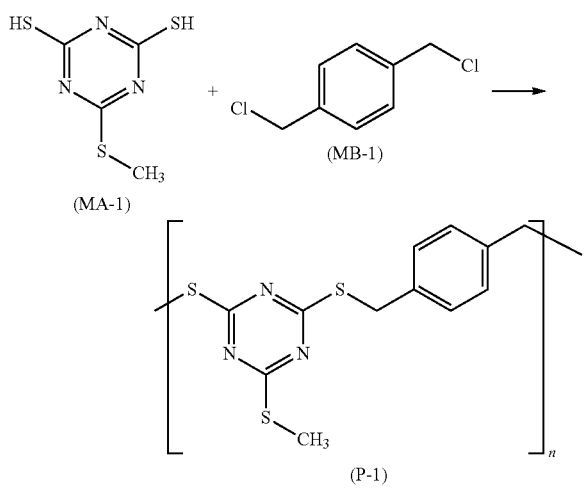

Example 2

A white triazine ring-containing polymer (P-2) was obtained according to the same method as Example 1 except that 4,4'-bis(chloromethyl)biphenyl (MB-2) as used instead of the α,α'-dichloro-p-xylene (MB-1) in the polymerization reaction. The obtained polymer has a number average molecular weight of 25,000 Da and a weight average molecular weight of 60,000 Da.

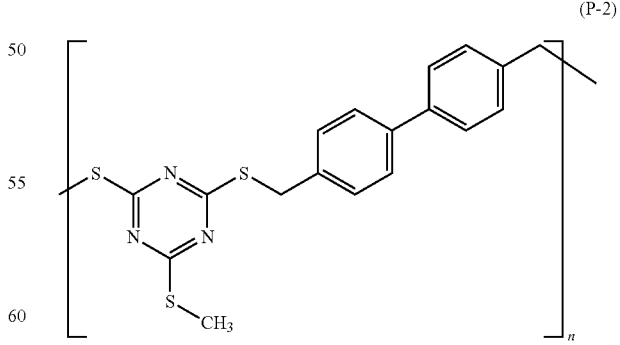

Example 3

A white triazine ring-containing polymer (P-3) was obtained according to the same method as Example 1 except that the α,α'-dichloro-m-xylene (MB-3) and the 4,4'-bis(chloromethyl)biphenyl (MB-2) (in the following formula, n:m=1:1) were used instead of the α,α'-dichloro-p-xylene (MB-1) in the polymerization reaction. The obtained polymer (copolymer) has a number average molecular weight of 28,000 Da and a weight average molecular weight of 58,000 Da.

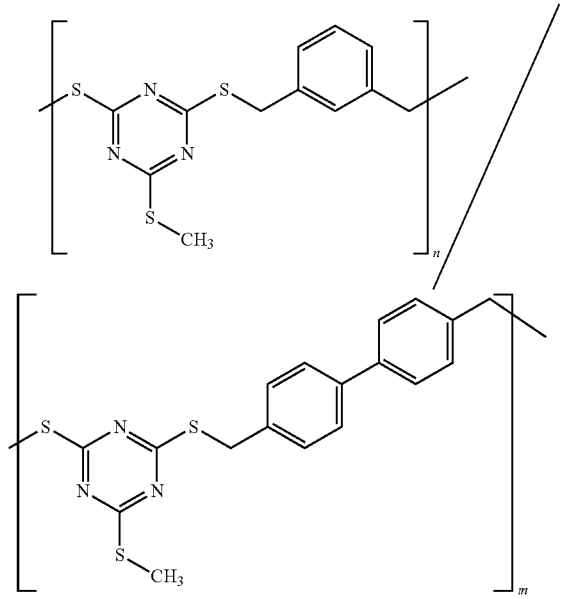

Example 4

A white triazine ring-containing polymer (P-4) was obtained according to the same method as Example 1 except that the 2-benzylthio-1,3,5-triazine-4,6-dithiol (MA-2) as used instead of the α,α'-dichloro-p-xylene (MB-1) in the polymerization reaction. The obtained polymer has a number average molecular weight of 25,000 Da and a weight average molecular weight of 60,000 Da.

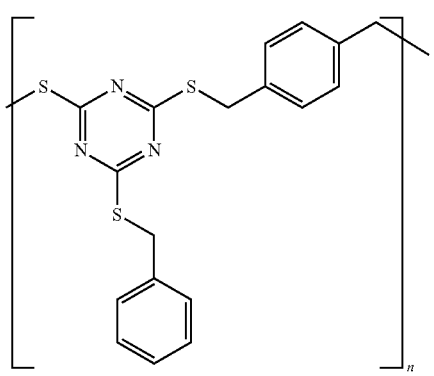

Comparative Example 1

A triazine ring-containing polymer (P-5) was synthesized in a method disclosed in Japanese Patent Laid-Open Publication No. 2014-162829. 2-anilino-4,6-bis(4-aminoanilino)-1,3,5-triazine (0.384 g, 1.00 mmol) along with NMP (2 mL) were put in a 100 mL 3-neck flask and then, the triazine was dissolved therein. Subsequently, bis(4,6-dimethoxy-1,3,5-triazin-2-yl)isophthalate (0.444 g, 1.00 mmol) was added thereto and then, reacted at room temperature for 6 hours. The reaction solution was poured into 200 mL of methanol, and a polymer precipitated therein was filtered, separated, washed with methanol, and dried at room temperature under a reduced pressure to obtain a triazine ring-containing polymer (P-5). The obtained polymer has a number average molecular weight of 25,000 Da and a weight average molecular weight of 51,000 Da.

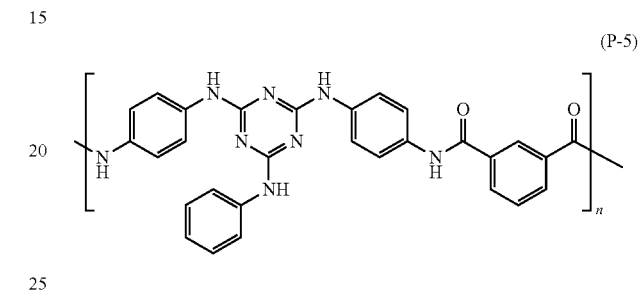

Comparative Example 2

A white-colored triazine ring-containing polymer (P-6) was obtained according to the same method as Example 1 except that 1,4-dibromobutane (MB-5) was used instead of the α,α'-dichloro-p-xylene (MB-1) in the polymerization reaction. The obtained polymer has a number average molecular weight of 20,000 Da and a weight average molecular weight of 52,000 Da.

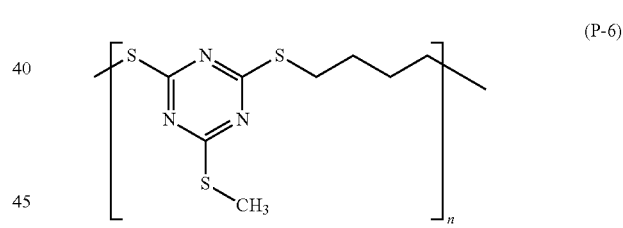

Evaluation 1

Using the above measuring methods, the refractive indices ($n_d$, 587.6 nm), Abbe's numbers ($v_d$), glass transition temperatures ($T_g$), and hazes of the triazine ring-containing polymers of Examples 1 to 4 and Comparative Examples 1 and 2 were measured. The results are shown in Table 1.

TABLE 1

|  | Polymer | Refractive index ($n_d$) | Abbe's number ($v_d$) | Tg (° C.) | Haze (%) |
|---|---|---|---|---|---|
| Example 1 | (P-1) | 1.742 | 17.3 | 84 | 4.4 |
| Example 2 | (P-2) | 1.732 | 18.0 | 103 | 4.8 |
| Example 3 | (P-3) | 1.737 | 17.9 | 104 | 3.5 |
| Example 4 | (P-4) | 1.724 | 19.8 | 101 | 4.7 |
| Comparative Example 1 | (P-5) | 1.730 | 9.4 | 183 | 8.3 |
| Comparative Example 2 | (P-6) | 1.675 | 29.2 | 53 | 4.1 |

As shown in Table 1, the polymers including a structural unit A and a structural unit B have a glass transition temperature of greater than or equal to about 80° C. and less than 105° C.

In general, a temperature for injection-molding an optical resin is preferably within a range of a glass transition temperature (Tg) of the polymer plus 120° C., or a range of 200° C. to 300° C. In other words, when the glass transition temperature ($T_g$) of the polymer is in a range of 80° C. to 190° C., the polymer may be appropriate for injection molding.

Since the glass transition temperatures of the polymers according to Examples 1 to 4 all are in the range of 80° C. to 180° C., the polymers are appropriate for injection molding. On the contrary, since the polymer of Comparative Example 1 has a higher glass transition temperature of 183° C., and the polymer of Comparative Example 2 has a lower glass transition temperature of 53° C., the polymers are not suitable for the injection molding.

Synthesis of Triazine Ring-Containing Polymer 2

Example 5

2-methylthio-1,3,5-triazine-4,6-dithiol (MA-1, 0.430 g, 2.25 mmol) and 2-anilino-1,3,5-triazine-4,6-dithiol (MA-3, 0.059 g, 0.25 mmol) were combined in a 50 mL flask, 4.5 mL of pure water as added thereto, and then, 0.51 mL of a 10 M NaOH aqueous solution as added thereto. Subsequently, a solution was prepared by dissolving α,α'-dichloro-p-xylene (MB-1, 438 mg, 2.5 mmol) in 9 mL of nitrobenzene and then, this solution added to the aqueous solution. 40 mg of tetrabutyl ammonium bromide as added thereto and then, the mixture was vigorously stirred at 50° C. for 24 hours. The reaction solution was added to methanol in a dropwise fashion and reprecipitated to obtain a white-colored triazine ring-containing polymer (A-1). The obtained polymer has a number average molecular weight of 46,500 Da and a weight average molecular weight of 101,400 Da.

Examples 6 to 9

White-colored triazine ring-containing polymers (A-2 to A-5) were obtained according to the same method as Example 9 except that the mole ratio of the monomer MA-1 and the monomer MA-3 in the polymerization reaction were varied as shown in Table 2. The number average molecular weights and the weight average molecular weights of the obtained polymers are shown in Table 2.

TABLE 2

|  | Monomer (mole ratio) | | Polymer | Number average molecular weight (kDa) | Weight average molecular weight (kDa) | Glass transition temperature (° C.) |
| --- | --- | --- | --- | --- | --- | --- |
|  | MA-3 | MA-1 |  |  |  |  |
| Example 5 | 10 | 90 | A-1 | 46.5 | 101.4 | 84 |
| Example 6 | 25 | 75 | A-2 | 73.4 | 185.7 | 97 |
| Example 7 | 50 | 50 | A-3 | 53.4 | 132.4 | 101 |
| Example 8 | 75 | 25 | A-4 | 48.2 | 102.2 | 112 |
| Example 9 | 90 | 10 | A-5 | 60.2 | 172.8 | 120 |

Examples 10 to 14

White-colored triazine ring-containing polymers (B-1 to B-5) were obtained according to the same method as Examples 5 to 9 except that 4,4'-bis(chloromethyl)biphenyl (MB-2) as used instead of the α,α'-dichloro-p-xylene (MB-1) in the polymerization reaction. The number average molecular weight and the weight average molecular weight of the obtained polymer are shown in Table 3.

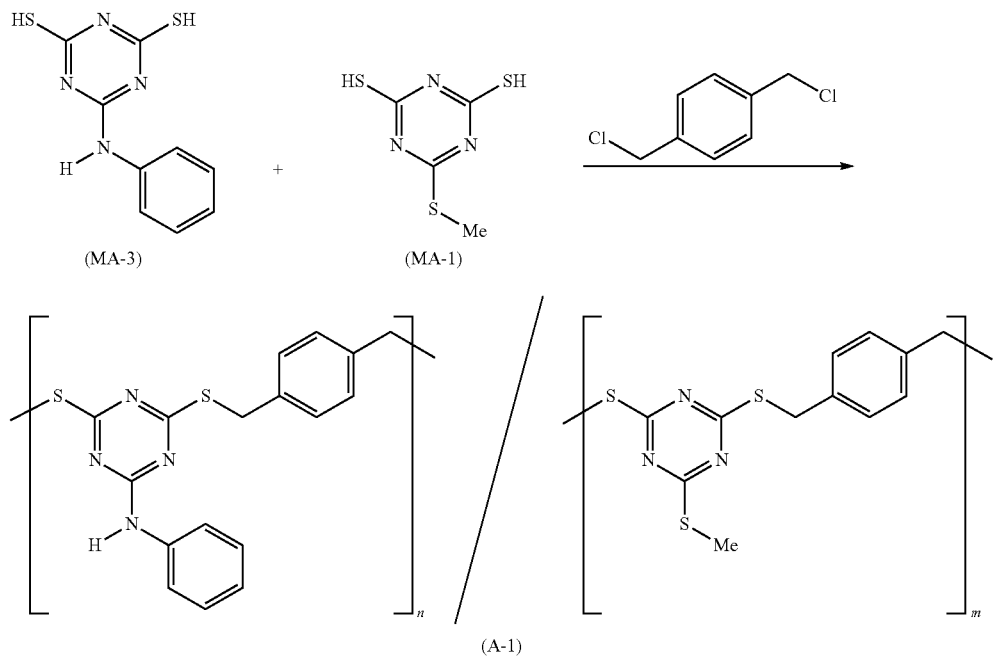

(A-1)

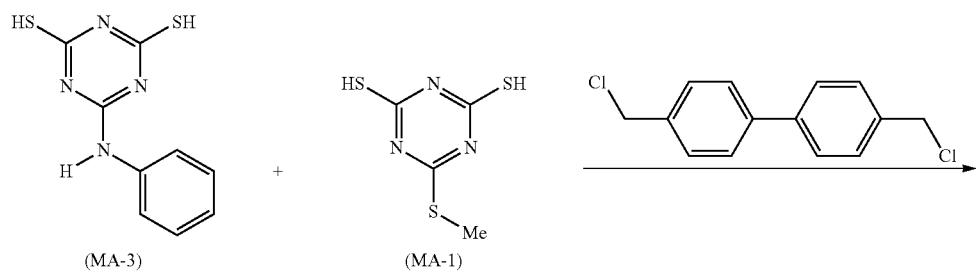

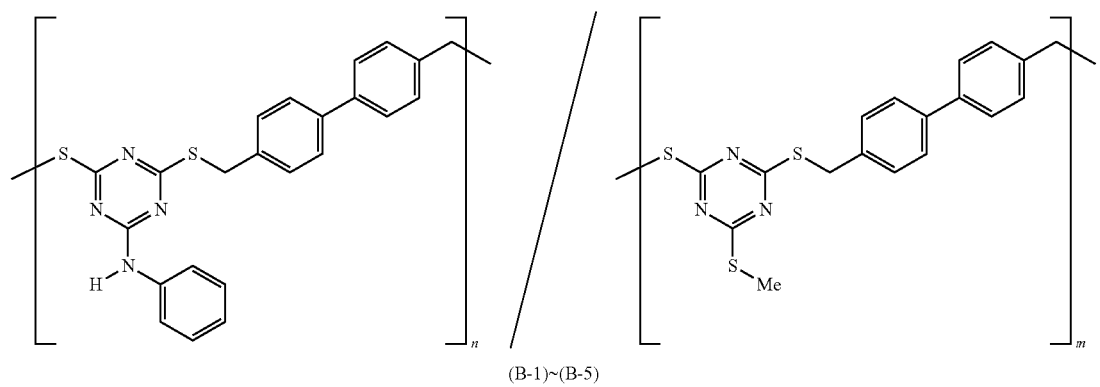

(B-1)~(B-5)

Evaluation 3

Using the above measuring methods, the glass transition temperatures of the triazine ring-containing polymers obtained in Examples 10 to 14 were measured and the results are shown in Table 3.

TABLE 3

| | Monomer (mole ratio) | | | Number average molecular weight | Weight average molecular weight | Glass transition temperature |
|---|---|---|---|---|---|---|
| | MA-3 | MA-1 | Polymer | (kDa) | (kDa) | (° C.) |
| Example 10 | 10 | 90 | B-1 | 20.4 | 862.9 | 105 |
| Example 11 | 25 | 75 | B-2 | 19.3 | 484.4 | 121 |
| Example 12 | 50 | 50 | B-3 | 15.6 | 258.9 | 126 |

TABLE 3-continued

| | Monomer (mole ratio) | | | Number average molecular weight | Weight average molecular weight | Glass transition temperature |
|---|---|---|---|---|---|---|
| | MA-3 | MA-1 | Polymer | (kDa) | (kDa) | (° C.) |
| Example 13 | 75 | 25 | B-4 | 18.0 | 216.0 | 130 |
| Example 14 | 90 | 10 | B-5 | 21.0 | 178.5 | 132 |

Examples 15 to 23

White-colored triazine ring-containing polymers (C-1 to C-9) were obtained according to the same method as Example 5 except that 2-(N-methyl anilino)-1,3,5-triazine-4,6-dithiol (MA-4) was used instead of the 2-methylthio-1,3,5-triazine-4,6-dithiol (MA-1) in the polymerization reaction, and the mole ratio of monomers was varied as shown in Table 4. The number average molecular weight and the weight average molecular weight of the obtained polymer are shown in Table 4.

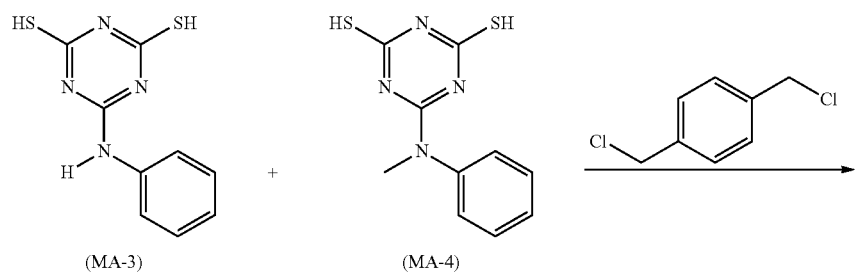

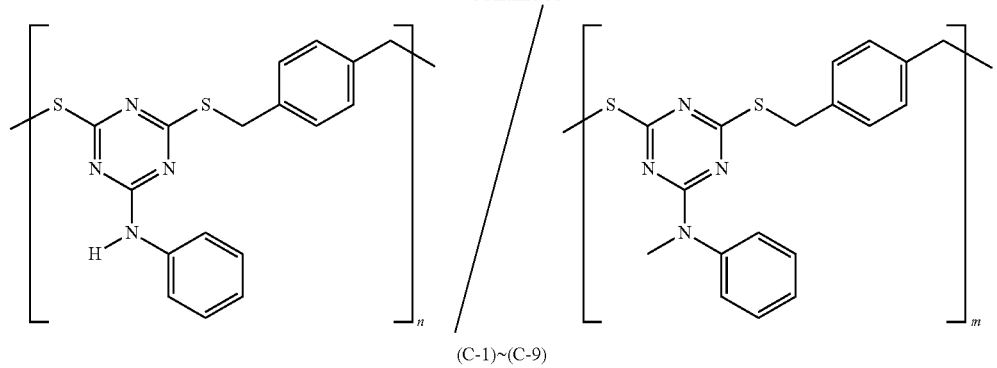

(C-1)~(C-9)

Evaluation 4

Using the above measuring methods, the glass transition temperatures of the triazine ring-containing polymers obtained in Examples 15 to 23 were measured and the results are shown in Table 4.

TABLE 4

| Monomer (mole ratio) | | | Number average molecular weight | Weight average molecular weight | Glass transition temperature |
|---|---|---|---|---|---|
| MA-3 | MA-4 | Polymer | (kDa) | (kDa) | (° C.) |
| Example 15 | 5 | 95 | C-1 | 25.0 | 81.5 | 113 |
| Example 16 | 7 | 93 | C-2 | 25.7 | 69.9 | 118 |
| Example 17 | 10 | 90 | C-3 | 61.5 | 134.1 | 121 |
| Example 18 | 20 | 80 | C-4 | 73.3 | 165.7 | 120 |
| Example 19 | 30 | 70 | C-5 | 65.5 | 140.2 | 116 |
| Example 20 | 40 | 60 | C-6 | 58.3 | 128.3 | 120 |
| Example 21 | 50 | 50 | C-7 | 68.3 | 162.6 | 123 |
| Example 22 | 70 | 30 | C-8 | 60.2 | 127.6 | 123 |
| Example 23 | 90 | 10 | C-9 | 64.6 | 116.3 | 124 |

Examples 24 to 26

White triazine ring-containing polymers (D-1 to D-3) were obtained according to the same method as Examples 17, 21, and 23 except that 4,4'-bis(chloromethyl)biphenyl (MB-2) as used instead of the α,α'-dichloro-p-xylene (MB-1) in the polymerization reaction.

The number average molecular weight and the weight average molecular weight of the obtained polymer are shown in Table 5.

Evaluation 5

Using the above measuring methods, the glass transition temperatures of the triazine ring-containing polymers obtained in Examples 24 to 26 were measured and the results are shown in Table 5.

TABLE 5

| Monomer (mole ratio) | | | Number average molecular weight | Weight average molecular weight | Glass transition temperature |
|---|---|---|---|---|---|
| MA-3 | MA-4 | Polymer | (kDa) | (kDa) | (° C.) |
| Example 24 | 10 | 90 | D-1 | 32.0 | 77.4 | 137 |
| Example 25 | 50 | 50 | D-2 | 45.3 | 98.8 | 140 |
| Example 26 | 90 | 10 | D-3 | 48.0 | 136.8 | 142 |

Evaluation 6

Using the above measuring methods, the refractive indices ($n_d$, 587.6 nm), Abbe's numbers ($v_d$), and hazes of the triazine ring-containing polymers of Examples 5 to 7, 9, 10, 12, 14, 15, 17, 21, 23, and 25 were measured and the results are shown in Table 6.

TABLE 6

| | Polymer | Refractive index ($n_d$) | Abbe's number ($v_d$) | Haze (%) |
|---|---|---|---|---|
| Example 5 | A-1 | 1.738 | 19.3 | 2.2 |
| Example 6 | A-2 | 1.736 | 19.8 | 2.4 |
| Example 7 | A-3 | 1.733 | 20.3 | 1.8 |
| Example 9 | A-5 | 1.731 | 21.2 | 2.0 |
| Example 10 | B-1 | 1.742 | 18.3 | 2.8 |
| Example 12 | B-3 | 1.739 | 19.1 | 2.3 |
| Example 14 | B-5 | 1.737 | 20.9 | 3.0 |
| Example 15 | C-1 | 1.704 | 21.7 | 1.9 |
| Example 17 | C-3 | 1.707 | 21.3 | 1.2 |
| Example 21 | C-7 | 1.717 | 20.8 | 2.5 |
| Example 23 | C-9 | 1.737 | 20.5 | 2.9 |
| Example 25 | D-2 | 1.737 | 19.0 | 2.2 |

As shown in Table 6, the polymers including a structural unit consisting of a structural unit A and a structural unit B may have a high refractive index (greater than or equal to 1.70) and a low haze (less than or equal to 4%), even when two types of the structural unit A are included.

Synthesis of Triazine Ring-Containing Polymer 3

Example 27

2-methylthio-1,3,5-triazine-4,6-dithiol (MA-1, 11.9 g, 62.1 mmol) and 2-(N-methylanilino)-1,3,5-triazine-4,6-dithiol (MA-4, 1.7 g, 6.9 mmol) were added to 120 mL of pure water in a 50 mL flask, and 14 mL of a 10 M NaOH aqueous solution was added thereto. A solution of α,α'-dichloro-p-xylene (MB-1, 12.3 g, 69 mmol) dispersed in 120 mL of nitrobenzene was prepared separately and then, and added to the aqueous solution. 2 g of tetrabutyl ammonium bromide as added thereto, and then, the mixture was vigorously stirred at 50° C. for 24 hours. The reaction solution was added dropwise in methanol and reprecipitated to obtain a white-colored triazine ring-containing polymer E-1. The obtained polymer has a number average molecular weight of 19,100 Da and a weight average molecular weight of 55,300 Da.

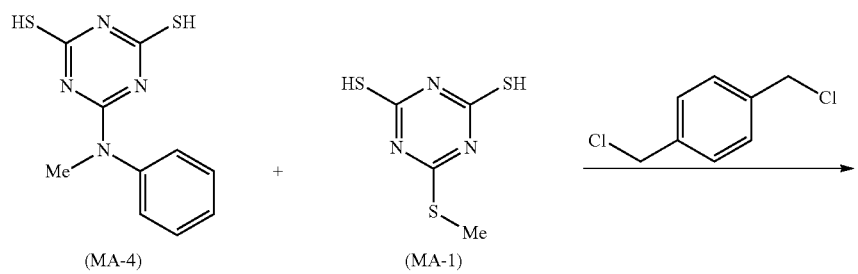

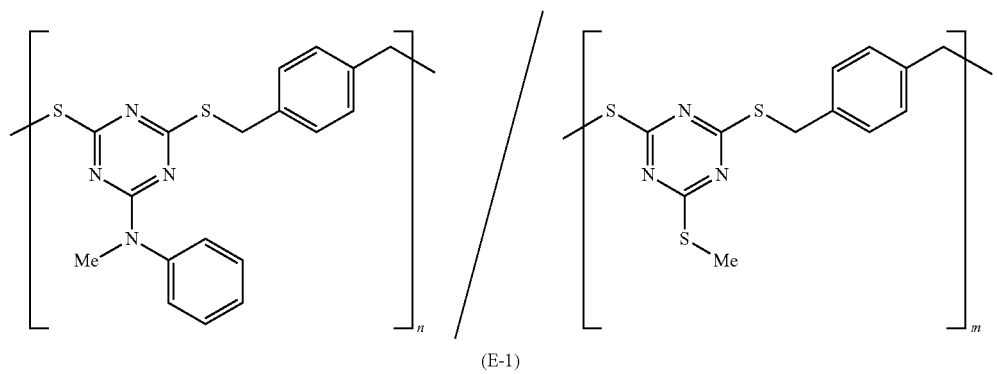

(E-1)

Examples 28 to 31

White-colored triazine ring-containing polymers (E-2 to E-5) were obtained according to the same method as Example 27 except that the mole ratio of the monomer MA-4 and the monomer MA-1 were varied in the polymerization reaction as shown in Table 7. The number average molecular weight and the weight average molecular weight of the obtained polymer are shown in Table 7.

Evaluation 7

Using the above measuring methods, the glass transition temperatures of the triazine ring-containing polymers obtained in Examples 27 to 31 were measured and the results are shown in Table 7.

TABLE 7

| | Monomer (mole ratio) | | | Number average molecular weight | Weight average molecular weight | Glass transition temperature |
|---|---|---|---|---|---|---|
| | MA-4 | MA-1 | Polymer | (kDa) | (kDa) | (° C.) |
| Example 27 | 10 | 90 | E-1 | 19.1 | 55.3 | 81 |
| Example 28 | 25 | 75 | E-2 | 16.6 | 69.7 | 87 |

TABLE 7-continued

| | Monomer (mole ratio) | | | Number average molecular weight | Weight average molecular weight | Glass transition temperature |
|---|---|---|---|---|---|---|
| | MA-4 | MA-1 | Polymer | (kDa) | (kDa) | (° C.) |
| Example 29 | 50 | 50 | E-3 | 24.3 | 75.4 | 94 |
| Example 30 | 75 | 25 | E-4 | 37.8 | 98.2 | 103 |
| Example 31 | 90 | 10 | E-5 | 41.4 | 120.2 | 110 |

Examples 32 to 36

White-colored triazine ring-containing polymers (F-1 to F-5) were obtained according to the same methods as Examples 27 to 31 except that the 4,4'-bis(chloromethyl)biphenyl (MB-2) was used instead of the α,α'-dichloro-p-xylene (MB-1) in the polymerization reaction. Number average molecular weights and weight average molecular weights of the polymers are shown in Table 8.

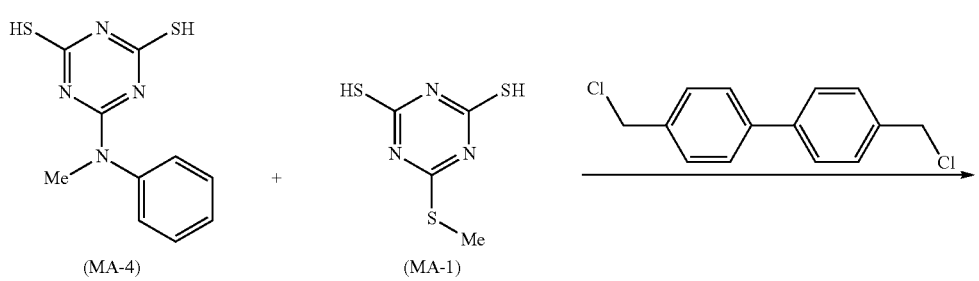

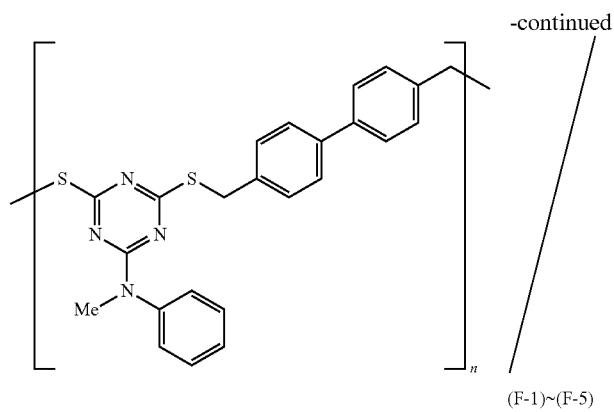
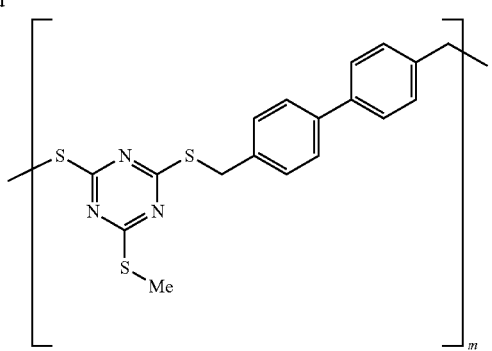

(F-1)~(F-5)

TABLE 8

| | Monomer (mole ratio) | | | Number average molecular weight (kDa) | Weight average molecular weight (kDa) | Glass transition temperature (° C.) |
|---|---|---|---|---|---|---|
| | MA-4 | MA-1 | Polymer | | | |
| Example 32 | 10 | 90 | F-1 | 14.7 | 32.3 | 120 |
| Example 33 | 25 | 75 | F-2 | 23.1 | 67.0 | 123 |
| Example 34 | 50 | 50 | F-3 | 27.5 | 68.8 | 126 |
| Example 35 | 75 | 25 | F-4 | 18.0 | 126.0 | 130 |
| Example 36 | 90 | 10 | F-5 | 21.0 | 105.0 | 132 |

Examples 37 to 63

White-colored triazine ring-containing polymers (G-1 to G-27) were obtained according to the same method as Example 27 except that in the polymerization reaction, the mole ratio of the 2-(N-methylanilino)-1,3,5-triazine-4,6-dithiol (MA-4) and the 2-methylthio-1,3,5-triazine-4,6-dithiol (MA-1) were varied as shown in Table 9, and the α,α'-dichloro-p-xylene (MB-1) and the 4,4'-bis(chloromethyl)biphenyl (MB-2) in a mole ratio shown in Table 9 were used instead of the α,α'-dichloro-p-xylene (MB-1). The number average molecular weights and the weight average molecular weights of the obtained polymers are shown in Table 9.

Evaluation 8

Using the above measuring methods, the glass transition temperatures of the triazine ring-containing polymers obtained in Examples 37 to 63 were measured and the results are shown in Table 9.

TABLE 9

| | Monomer (mole ratio) | | | | | Number average molecular weight (kDa) | Weight average molecular weight (kDa) | $T_g$ (° C.) |
|---|---|---|---|---|---|---|---|---|
| | structural unit A | | structural unit B | | | | | |
| | MA-4 | MA-1 | MB-1 | MB-2 | Polymer | | | |
| Example 37 | 10 | 90 | 10 | 90 | G-1 | 20.3 | 85.3 | 117 |
| Example 38 | 10 | 90 | 20 | 80 | G-2 | 22.4 | 85.1 | 110 |
| Example 39 | 10 | 90 | 30 | 70 | G-3 | 27.6 | 102.1 | 109 |
| Example 40 | 10 | 90 | 50 | 50 | G-4 | 30.2 | 135.9 | 104 |
| Example 41 | 10 | 90 | 70 | 30 | G-5 | 34.5 | 144.9 | 94 |
| Example 42 | 10 | 90 | 80 | 20 | G-6 | 36.7 | 143.1 | 88 |
| Example 43 | 10 | 90 | 90 | 10 | G-7 | 48.2 | 269.9 | 85 |
| Example 44 | 25 | 75 | 10 | 90 | G-8 | 24.6 | 100.9 | 114 |
| Example 45 | 25 | 75 | 20 | 80 | G-9 | 29.1 | 104.8 | 109 |
| Example 46 | 25 | 75 | 30 | 70 | G-10 | 28.2 | 104.3 | 110 |
| Example 47 | 25 | 75 | 50 | 50 | G-11 | 34.4 | 158.2 | 90 |
| Example 48 | 25 | 75 | 70 | 30 | G-12 | 40.9 | 188.1 | 99 |
| Example 49 | 25 | 75 | 80 | 20 | G-13 | 39.4 | 134.0 | 98 |

TABLE 9-continued

| | Monomer (mole ratio) | | | | | Number average molecular weight (kDa) | Weight average molecular weight (kDa) | $T_g$ (° C.) |
|---|---|---|---|---|---|---|---|---|
| | structural unit A | | structural unit B | | | | | |
| | MA-4 | MA-1 | MB-1 | MB-2 | Polymer | | | |
| Example 50 | 25 | 75 | 90 | 10 | G-14 | 56.6 | 322.6 | 82 |
| Example 51 | 50 | 50 | 10 | 90 | G-15 | 28.2 | 107.2 | 121 |
| Example 52 | 50 | 50 | 20 | 80 | G-16 | 32.1 | 118.8 | 119 |
| Example 53 | 50 | 50 | 30 | 70 | G-17 | 33.5 | 117.3 | 115 |
| Example 54 | 50 | 50 | 50 | 50 | G-18 | 39.0 | 159.9 | 111 |
| Example 55 | 50 | 50 | 70 | 30 | G-19 | 42.1 | 168.4 | 106 |
| Example 56 | 50 | 50 | 80 | 20 | G-20 | 48.3 | 183.5 | 104 |
| Example 57 | 50 | 50 | 90 | 10 | G-21 | 55.2 | 253.9 | 99 |
| Example 58 | 75 | 25 | 25 | 75 | G-22 | 36.4 | 142.0 | 109 |
| Example 59 | 75 | 25 | 50 | 50 | G-23 | 41.9 | 184.4 | 116 |
| Example 60 | 75 | 25 | 75 | 25 | G-24 | 47.3 | 198.7 | 124 |
| Example 61 | 90 | 10 | 25 | 75 | G-25 | 39.8 | 155.2 | 115 |
| Example 62 | 90 | 10 | 50 | 50 | G-26 | 45.5 | 209.3 | 122 |
| Example 63 | 90 | 10 | 75 | 25 | G-27 | 48.3 | 207.7 | 127 |

Evaluation 9

Using the above measuring methods, the refractive indices ($n_d$, 587.6 nm), Abbe's numbers ($v_d$), and hazes of the triazine ring-containing polymers obtained in Examples 27 to 30, 33 to 35, 40, 44, 46, 47, 54, 56, and 59 to 62 were measured. The results are shown in Table 10.

TABLE 10

| | Polymer | Refractive index ($n_d$) | Abbe's number ($v_d$) | Haze (%) |
|---|---|---|---|---|
| Example 27 | E-1 | 1.705 | 25.3 | 3.1 |
| Example 28 | E-2 | 1.710 | 24.2 | 2.5 |
| Example 29 | E-3 | 1.718 | 23.8 | 3.7 |
| Example 30 | E-4 | 1.727 | 21.2 | 2.9 |
| Example 33 | F-2 | 1.715 | 23.1 | 4.0 |
| Example 34 | F-3 | 1.724 | 21.9 | 4.1 |
| Example 35 | F-4 | 1.731 | 20.4 | 4.0 |
| Example 40 | G-4 | 1.728 | 21.1 | 2.9 |
| Example 44 | G-8 | 1.733 | 21.7 | 2.8 |
| Example 46 | G-10 | 1.725 | 22.0 | 2.5 |
| Example 47 | G-11 | 1.722 | 22.3 | 3.4 |
| Example 54 | G-18 | 1.724 | 23.1 | 2.8 |
| Example 56 | G-20 | 1.723 | 24.5 | 2.5 |
| Example 59 | G-23 | 1.729 | 20.9 | 3.5 |
| Example 60 | G-24 | 1.728 | 21.0 | 3.0 |
| Example 61 | G-25 | 1.711 | 23.8 | 3.3 |
| Example 62 | G-26 | 1.713 | 23.5 | 3.5 |

As shown in Table 10, the polymers including a structural unit consisting of a structural unit A and a structural unit B may accomplish a high refractive index (greater than or equal to 1.70) and a low haze (less than or equal to 4%), even when two types of the structural unit A and two types of the structural unit B are included.

Evaluation 10

A solubility test of the triazine ring-containing polymers according to Examples 2, 32 to 36, and 44 to 50 was performed in the measuring method, and then, solubility thereof was evaluated, and the results are shown in Table 11.

The following symbols are used in Table 11:
X: Solubility at room temperature (25° C.) is less than 1 g/mL,
(Δ): Solubility at 80° C. is greater than or equal to 1 g/mL,
Δ: Solubility at room temperature (25° C.) is greater than or equal to 1 g/mL,
◯: Solubility at room temperature (25° C.) is greater than or equal to 5 g/mL,
◉: Solubility at room temperature (25° C.) is greater than or equal to 10 g/mL.

TABLE 11

| | Polymer | NMP | THF | Chloroform |
|---|---|---|---|---|
| Example 2 | P-4 | X(Δ) | X | X |
| Example 32 | F-1 | ◯ | Δ | X |
| Example 33 | F-2 | ◯ | Δ | X |
| Example 34 | F-3 | ◯ | Δ | X |
| Example 35 | F-4 | ◯ | Δ | X |
| Example 36 | F-5 | ◯ | Δ | X |
| Example 44 | G-8 | ◉ | Δ | ◉ |
| Example 45 | G-9 | ◉ | Δ | ◉ |
| Example 46 | G-10 | ◉ | Δ | ◉ |
| Example 47 | G-11 | ◉ | Δ | ◉ |
| Example 48 | G-12 | ◉ | Δ | ◉ |
| Example 49 | G-13 | ◉ | Δ | ◉ |
| Example 50 | G-14 | ◉ | Δ | ◉ |

As shown in Table 11, when the polymers including two types of the structural unit A (Examples 32 to 36 and 44 to 50) are compared with the polymer including the structural unit A alone (Example 2), solubility about several types of solvents is confirmed. When the types of the solvent in which the polymers are dissolved are increased, there are more selectable solvents during polymer purification that uses solution, such as, for example, the reprecipitation. In general, when a monomer or an oligomer included in a polymer is removed, there may be an effect of increasing Tg or improving a refractive index, which is effectively obtained through solution purification. Therefore, the polymer of the presently disclosed subject matter, for which the solution purification is performed, has solubility about several types of solvents and may be advantageously used as an optical polymer requiring a high refractive index.

In addition, when the polymers including two types of the structural unit B (Examples 44 to 50) is compared with the polymers including the structural unit B alone (Examples 32 to 36), solubility in several types of organic solvents is improved. Since a polymer having high solubility has an effect of reducing a solvent amount used for the solution purification, a solvent amount used for mass production may be reduced, and a manufacture cost-reducing effect may be expected.

In addition, referring to the solubility test results shown in Table 11 and the haze results shown in Tables 1 and 10, a polymer having higher solubility in a solvent exhibits a low haze. The reason is that the solubility of the polymer is improved, and accordingly, impurities such as a monomer, an oligomer, or the like may be easily removed during solvent purification, and as a result, a haze of the polymer is decreased.

In this way, the triazine ring-containing polymer of the present disclosure has a high refractive index, high transparency, a high glass transition temperature, and excellent molding property, and thus, particularly, appropriate for smartphone lenses and the like.

In addition, the triazine ring-containing polymers of Examples 63 to 69 were tested using the above-described methods and the following methods.

Measurement of Viscosity of Polymer in Molten State

Viscosity of the polymers in a molten state (rheology) as measured at 250° C. under a nitrogen atmosphere at a shear rate of 0.1 (1/s) by using a Rheometer (MCR302, Anton Paar GmbH).

Synthesis of Triazine Ring-Containing Polymer

Synthesis Example 1: Synthesis of 2-Anilino-4,6-Dichloro-1,3,5-Triazine 1

200 g (1.08 mol) of cyanuric chloride and 1 L of tetrahydrofuran were put in a 2 L 3-neck flask having a 500 mL drop lot and then, cooled to 0° C. in an ice bath. 300 mL of the tetrahydrofuran solution was added dropwise to 116.23 g (1.08 mol) of aniline through the drop lot for 120 minutes. After the dropwise addition, 300 mL of an aqueous solution in which 115 g of sodium carbonate is dissolved was added thereto and then, stirred for 30 minutes. After removing an upper tetrahydrofuran layer, the solvent as distilled under a reduced pressure to obtain 242 g (a yield of 93%) of 2-anilino-4,6-dichloro-1,3,5-triazine (1) having the following structure:

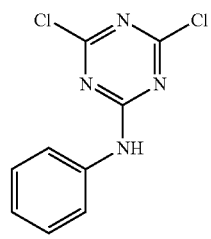 [SMILES: Clc1nc(Cl)nc(Nc2ccccc2)n1]

Synthesis Example 2: Synthesis of 2,7-Dibenzylthiothianthrene 2

4.85 g (43 mmol) of potassium tert-butoxide and 15 ml of dimethyl formamide were put in a 30 mL flask under a nitrogen atmosphere. After cooling to 0° C., 5.1 mL (42 mmol) of benzylmercaptan and 3.98 g (15.8 mmol) of 2,7-difluorothianthrene (DFT) were added thereto and then, heated to 60° C. and stirred at 60° C. for 24 hours. Subsequently, water was added to the reactant to obtain precipitates, and the precipitates were vacuum-dried to obtain 4.65 g (a yield of 64%) of 2,7-dibenzylthiothianthrene (DBTT) (2) having the following structure:

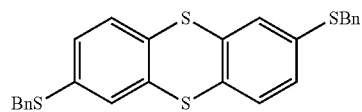

wherein Bn is a benzyl group.

Synthesis Example 3: Synthesis of 2,7-Thianthrene Dithiol 3

1.38 g (3.0 mmol) of DBTT (2) synthesized according to Synthesis Example 2, 0.078 g (0.31 mmol) of titanocene dichloride ($Cp_2TiCl_2$), and 10 mL of diglyme were put in a 50 mL flask at 0° C. under a nitrogen atmosphere, and 50 mL of a 1 Mn-butyl magnesium heptane solution was slowly added thereto and then, stirred at 0° C. for 3 hours. Subsequently, 20 mL of a sodium carbonate aqueous solution was slowly added thereto at 0° C. to stop the reaction. After adding dichloromethane and pure water to the reactant, a water layer was separated. After adding hydrochloric acid to the water layer, the obtained mixture was stirred for one hour. Precipitates therein were filtered and vacuum-dried to obtain 0.51 g (a yield of 60%) of 2,7-thianthrenedithiol (3) having the following structure:

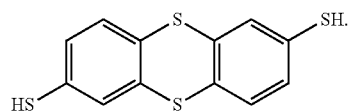 [SMILES: Sc1ccc2c(c1)Sc1ccc(S)cc1S2]

Example 64: Synthesis of Triazine Ring-Containing Polymer (4)

2.23 g (8.46 mmol) of the 2,7-thianthrenedithiol (3) synthesized according to Synthesis Example 3 was put in a 100 mL flask, 14 mL of pure water was added thereto, and 1.69 mL of a 10 M NaOH aqueous solution as added thereto and then, heated at 70° C. to obtain an aqueous solution. 2.00 g (8.46 mmol) of the 2-anilino-4,6-dichloro-1,3,5-triazine (1) synthesized according to Synthesis Example 1 as dissolved in 15 mL of nitrobenzene and then, added to the aqueous solution. 123 mg of hexadecyl trimethyl ammonium bromide as added to the obtained mixture and then, the mixture was vigorously stirred at 70° C. for 24 hours. The reaction solution was added dropwise to methanol and reprecipitated to obtain a white-colored triazine ring-containing polymer (4) having the following structure. The obtained triazine ring-containing polymer (4) has a number average molecular weight (Mn) of 20000 Da, a weight average molecular weight (Mw) of 125000 Da, and a glass transition temperature (Tg) of 187° C. In addition, viscosity of the triazine ring-containing polymer (4) in a molten state is less than 100,000 Pa·s:

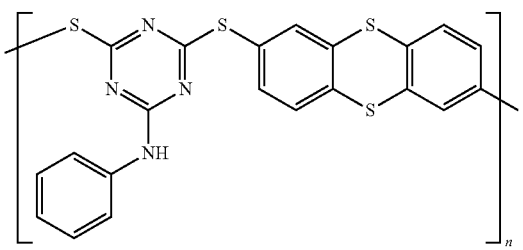

Example 65: Synthesis of Triazine Ring-Containing Polymer (5)

A white-colored triazine ring-containing polymer (5) having the following structure as obtained according to the same method as Example 64 except that 4.23 mmol of the 2-anilino-4,6-dichloro-1,3,5-triazine (1) and 4.23 mmol of 2-methylthio-4,6-dichloro-1,5-triazine were used instead of 8.46 mmol of the 2-anilino-4,6-dichloro-1,3,5-triazine (1). The obtained triazine ring-containing polymer (5) has a number average molecular weight (Mn) of 32,000 Da, a weight average molecular weight (Mw) of 70,000 Da, and a glass transition temperature (Tg) of 188° C.

Synthesis Example 4: Synthesis of 2-(N-Methylanilino)-4,6-Dichloro-1,3,5-Triazine 6

200 g (1.08 mol) of cyanuric chloride and 1 L of tetrahydrofuran were put in a 2 L 3-neck flask having a 500 mL drop lot and cooled to 0° C. in an ice bath. 300 mL of a tetrahydrofuran solution was added dropwise to 116.23 g (1.08 mol) of N-methylaniline through the drop lot for 120 minutes. After the addition, 300 mL of an aqueous solution in which 115 g of sodium carbonate is dissolved was added thereto and then, stirred for 30 minutes. After removing the upper tetrahydrofuran layer, the solvent was distilled under a reduced pressure to obtain 263 g (a yield of 95%) of 2-(N-methylanilino)-4,6-dichloro-1,3,5-triazine (6) having the following structure:

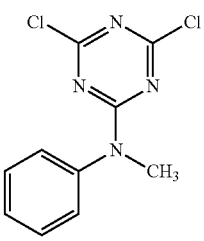 [SMILES: CN(c1ccccc1)c1nc(Cl)nc(Cl)n1]

Example 66: Synthesis of Triazine Ring-Containing Polymer (7)

1.20 g (8.46 mmol) of 1,4-benzenedithiol were put in a 100 mL flask, 10 mL of pure water was added thereto, and 1.69 mL of a 10 M NaOH aqueous solution was added thereto and then, heated at 70° C. to obtain an aqueous solution. 2.16 g (8.46 mmol) of 2-(N-methylanilino)-4,6-dichloro-1,3,5-triazine (6) synthesized in Synthesis Example 4 was dissolved in 14 mL of nitrobenzene and then, added to the aqueous solution. 123 mg of hexadecyl trimethyl ammonium bromide was added to the obtained mixture and then, the mixture was vigorously stirred at 70° C. for 24 hours. The reaction solution was added dropwise to methanol and reprecipitated to obtain a white-colored triazine ring-containing polymer (7) having the following structure. The obtained triazine ring-containing polymer (7) has a number average molecular weight (Mn) of 13000 Da, a weight average molecular weight (Mw) of 43000 Da, and a glass transition temperature (Tg) of 139° C.

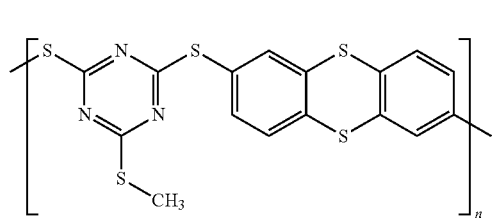 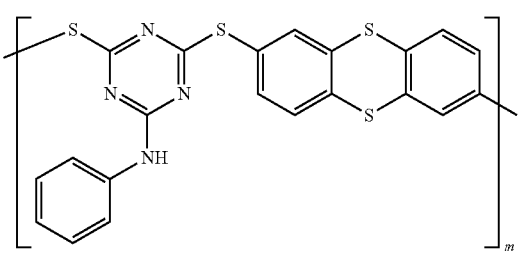

n:m = 1:1 (mole ratio)

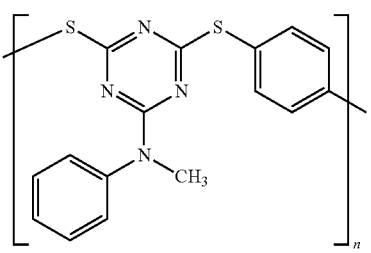

Example 67: Synthesis of Triazine Ring-Containing Polymer (8)

1.74 g (8.45 mmol) of 4,4-biphenyldithiol was put in a 100 mL flask, 14 mL of pure water was added thereto, and 1.69 mL of a 10 M NaOH aqueous solution was added thereto and then, heated at 70° C. to obtain an aqueous solution. 2.16 g (8.46 mmol) of the 2-(N-methylanilino)-4, 6-dichloro-1,3,5-triazine (6) synthesized in Synthesis Example 4 was dissolved in 15 mL of nitrobenzene and then, added to the aqueous solution. 123 mg of hexadecyl trimethyl ammonium bromide was added to the mixture and then, stirred at 70° C. for 24 hours. The reaction solution was added dropwise to methanol and reprecipitated to obtain a white-colored triazine ring-containing polymer (8) having the following structure. The obtained triazine ring-containing polymer (8) has a number average molecular weight (Mn) of 11000 Da, a weight average molecular weight (Mw) of 38000 Da, and a glass transition temperature (Tg) of 148° C.

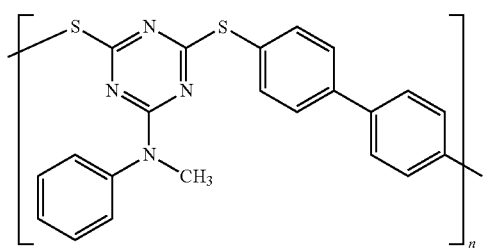

Example 68: Synthesis of Triazine Ring-Containing Polymer (9)

2.23 g (8.46 mmol) of the 2,7-thianthrenedithiol (3) synthesized in Synthesis Example 3 was put in a 100 mL flask, 14 mL of pure water was added thereto, and 1.69 mL of a 10 M NaOH aqueous solution was added thereto and then, heated at 70° C. to obtain an aqueous solution. 2.16 g (8.46 mmol) of the 2-(N-methylanilino)-4,6-dichloro-1,3,5-triazine (6) synthesized in Synthesis Example 4 was dissolved in 15 mL of nitrobenzene and then, added to the aqueous solution. 123 mg of hexadecyltrimethylammonium bromide was added to the obtained mixture and then, the mixture was vigorously stirred at 70° C. for 24 hours. The reaction solution was added dropwise to methanol and reprecipitated to obtain a white-colored triazine ring-containing polymer (9) having the following structure. The obtained triazine ring-containing polymer (9) has a number average molecular weight (Mn) of 20000 Da, a weight average molecular weight (Mw) of 125000 Da, and a glass transition temperature (Tg) of 175° C. In addition, viscosity of the triazine ring-containing polymer (9) in a molten state is less than 100,000 Pa·s:

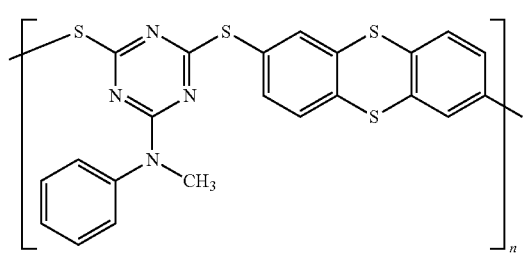

Example 69: Synthesis of Triazine Ring-Containing Polymer (10)

A white triazine ring-containing polymer (10) was obtained according to the same method Example 68 except that 4.23 mmol of the 2-(N-methylanilino)-4,6-dichloro-1,3,5-triazine (6) and 4.23 mmol of 2-methylthio-4,6-dichloro-1,5-triazine was used instead of 8.46 mmol of the 2-(N-methylanilino)-4,6-dichloro-1,3,5-triazine (6). The obtained triazine ring-containing polymer (10) has a number average molecular weight (Mn) of 18,000 Da, a weight average molecular weight (Mw) of 65,000 Da, and a glass transition temperature (Tg) of 182° C.

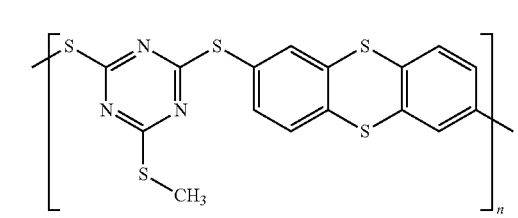

Example 70: Synthesis of Triazine Ring-Containing Polymer (11)

2.12 g (8.47 mmol) of 4,4'-thiobisbenzenethiol was put in a 100 mL flask, 14 mL of pure water was added thereto, and 1.69 mL of a 10 M NaOH aqueous solution was added thereto and then, heated at 70° C. to obtain an aqueous solution. 2.16 g (8.46 mmol) of the 2-(N-methylanilino)-4,6-dichloro-1,3,5-triazine (6) synthesized in Synthesis Example 4 was dissolved in 15 mL of nitrobenzene and then, added to the aqueous solution. 123 mg of hexadecyltrimethylammonium bromide was added to the obtained mixture and then, fervently stirred at 70° C. for 24 hours. The reaction solution was added dropwise to methanol and reprecipitated to obtain a white-colored triazine ring-containing polymer (11) having the following structure. The obtained triazine ring-containing polymer (11) has a number average molecular weight (Mn) of 24000 Da, a weight average molecular weight (Mw) of 85000 Da, and a glass transition temperature (Tg) of 160° C.

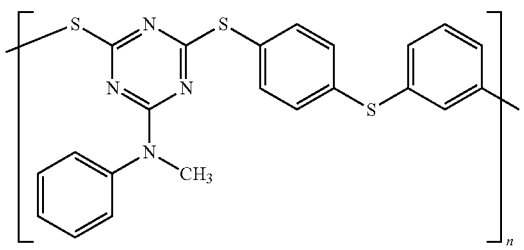

Comparative Example 3 Synthesis of Triazine Ring-Containing Polymer (12)

A white-colored triazine ring-containing polymer (12) was obtained according to the same method as Example 64 except that 1.03 g (8.46 mmol) of 1,4-butanedithiol was used instead of the 2,7-thianthrenedithiol (3). The obtained triazine ring-containing polymer (12) has a number average molecular weight (Mn) of 20000 Da, a weight average molecular weight (Mw) of 52000 Da, and a glass transition temperature (Tg) of 78° C.

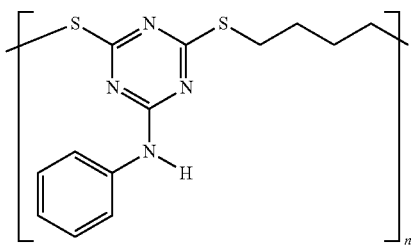

Evaluation 11

2 g of each triazine ring-containing polymer obtained in Examples 64 to 70 and Comparative Example 3 was compressed using a compression molding machine for 5 minutes under conditions of 200° C. and 10 MPa to manufacture of a sheet-shaped molded product having a thickness of 0.5 mm. The refractive indices ($n_d$) and Abbe's numbers ($v_d$) of the obtained sheet-shaped molded products were measured. The results are shown in Table 12.

TABLE 12

| Triazine ring-containing polymer | Refractive index ($n_d$) | Abbe's number ($v_d$) | Number average molecular weight (Da) | Weight average molecular weight (Da) | Glass transition temperature Tg (° C.) |
|---|---|---|---|---|---|
| Example 64 | (4) | 1.781 | 17.0 | 20,000 | 125,000 | 187 |
| Example 65 | (5) | 1.792 | 16.7 | 32,000 | 70,000 | 188 |
| Example 66 | (7) | 1.721 | 19.7 | 13,000 | 43,000 | 139 |
| Example 67 | (8) | 1.733 | 19.1 | 11,000 | 38,000 | 148 |
| Example 68 | (9) | 1.751 | 18.3 | 20,000 | 125,000 | 175 |
| Example 67 | (10) | 1.764 | 18.0 | 18,000 | 65,000 | 182 |
| Example 70 | (11) | 1.744 | 18.7 | 24,000 | 85,000 | 160 |
| Comparative Example3 | (12) | 1.681 | 23.3 | 20,000 | 52,000 | 78 |

Referring to the results of Table 12, the triazine ring-containing polymers (4) to (11) according to an embodiment all have a refractive index of greater than or equal to 1.7. The triazine ring-containing polymer (12) of Comparative Example 3 has a refractive index of greater than or equal to 1.6 and less than 1.7. In addition, the triazine ring-containing polymers (5) and (10) additionally having a methylthiotriazine monomer respectively have a refractive index by greater than or equal to 0.01 higher than the triazine ring-containing polymers (4) and (9) having no methylthiotriazine monomer. This result shows that the triazine ring-containing polymer including two types of structural unit A and one type of structural unit B derived from triazine has a much higher refractive index. Since a polymer having a higher refractive index is advantageously used for down-sizing-lightweight of lens (e.g., reducing the weight) and the like after the molding, the triazine ring-containing polymer including two types of this triazine-derived structural unit A may contribute to the down-sizing-lightweight of the lens and the like.

On the other hand, in order to be used for optical automotive parts requiring high weather resistance and particularly, heat resistance, a high glass transition temperature (Tg) of greater than or equal to 100° C. is preferred. The triazine ring-containing polymers (4) to (11) in the present Examples have a Tg of greater than or equal to 130° C. and thus may be used to provide an optical lens having excellent thermal stability. However, the triazine ring-containing polymer (12) of Comparative Example 3 has lower Tg of 78° C. and thus is not appropriate for this use. Accordingly, the triazine ring-containing polymer according to one or more embodiments of the disclosure has a high refractive index and a high glass transition temperature and exhibits thermoplasticity and thus may be appropriately used for automotive optical lens and the like.

While this disclosure has been described in connection with what is presently considered to be practical example embodiments, it is to be understood that the disclosure is not limited to the disclosed exemplary embodiments, but, on the contrary, is intended to cover various modifications and equivalent arrangements included within the spirit and scope of the appended claims.

What is claimed is:

1. A triazine ring-containing polymer comprising a structural unit represented by General Formula 1:

*-[A-B-]-*  General Formula 1 wherein, in General Formula 1,
A is represented by General Formula 2,
B is represented by General Formula 3, and
* indicates a point linked to another structural unit or atom;

[Structure of General Formula 2: triazine ring with two S substituents and L-R$_1$ group]

General Formula 2 wherein, in General Formula 2,
L is a single bond or a linking group,
R$_1$ is a group comprising an oxygen atom, a sulfur atom, a nitrogen atom, a selenium atom, or a combination thereof,
with the proviso that when R$_1$ comprises a nitrogen atom, then R$_2$ is represented by one of the following chemical formulae:

[Chemical structures: phenyl, biphenyl, terphenyl variants, naphthyl groups]

and
* indicates a point linked to another structural unit or atom;

*-[—(CR$_3$R$_4$)$_{m1}$—R$_2$—(CR$_5$R$_6$)$_{n1}$—]-*  General Formula 3 wherein, in General Formula 3,
R$_2$ is a divalent aromatic hydrocarbon group, or an aromatic hydrocarbon linking group in which two or more aromatic hydrocarbon groups are linked to each other by an alkylene group, an oxygen atom, a sulfur atom, or a selenium atom,
R$_3$ to R$_6$ are each independently a hydrogen atom, an alkyl group, or an aromatic hydrocarbon group,
m$_1$ and n$_1$ are independently 0 or 1, wherein at least one of m$_1$ and n$_1$ of General Formula 3 is 1 when R$_1$ is a group comprising a sulfur atom, and
* indicates a point linked to another group or structural unit.

2. The triazine ring-containing polymer of claim 1, wherein R$_2$ of General Formula 3 is represented by one of the following chemical formulae:

[Chemical structures: phenyl, biphenyl, terphenyl, naphthyl, isopropylidene-diphenyl, diphenyl ether, diphenyl sulfide, thianthrene groups]

, or

[Chemical structure: thianthrene-like]

.

3. The triazine ring-containing polymer of claim 1, wherein R$_2$ of General Formula 3 is represented by any one of the following chemical formulae:

[Chemical structures: thianthrene and diphenyl sulfide]

4. The triazine ring-containing polymer of claim 1, wherein m$_1$ and n$_1$ of General Formula 3 are both 0.

5. The triazine ring-containing polymer of claim 1, wherein at least one of m$_1$ and n$_1$ of General Formula 3 is 1, and R$_3$ to R$_6$ are each independently a hydrogen atom, a C1 to C30 alkyl group, or a C6 to C30 aromatic hydrocarbon group.

6. The triazine ring-containing polymer of claim 1, wherein m$_1$ and n$_1$ of General Formula 3 are both 1, and R$_3$ to R$_6$ are each independently a hydrogen atom, a C1 to C10 alkyl group, or a C6 to C20 aromatic hydrocarbon group.

7. The triazine ring-containing polymer of claim 1, wherein when L of General Formula 2 is a linking group, the linking group is a C1 to C6 alkylene group, a divalent C6 to C30 aromatic hydrocarbon group, or a an aromatic hydrocarbon linking group in which two or more C6 to C30 aromatic hydrocarbon groups are linked to each other by a single bond, a C1 to C6 alkylene group, or an atom of oxygen, sulfur, or selenium.

8. The triazine ring-containing polymer of claim 1, wherein L of General Formula 2 is a single bond, a methylene group, an ethylene group, a phenylene group, a biphenylene group, or a naphthalene group.

9. The triazine ring-containing polymer of claim 1, wherein L of General Formula 2 is a single bond.

10. The triazine ring-containing polymer of claim 1, wherein $R_1$ of General Formula 2 is represented by one of Formulae (4-1), (4-2-1), (4-2-2), (4-3), (-4), (4-5), (4-6), (4-7), or (4-8):

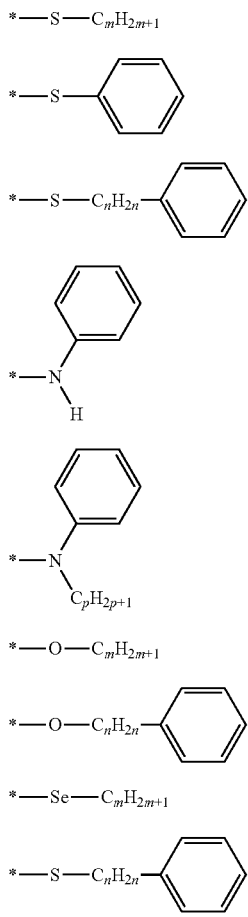

wherein, in Formula (4-1), (4-5), and (4-7), m is an integer of 1 to 6, in Formula (4-2-2), (4-6), and (4-8), n is an integer of 1 to 6, and in Formula (4-4), p is an integer of 1 to 6.

11. The triazine ring-containing polymer of claim 1, comprising a structural unit represented by General Formula (1-1) and a structural unit represented by General Formula (1-2):

$$*-[A'-B-]-* \quad (1\text{-}1)$$

$$*-[A''-B-]-* \quad (1\text{-}2)$$

wherein, in General Formula (1-1) and General Formula (1-2),

A and A' are each independently represented by General Formula 2, wherein A and A' are different from each other, B is represented by General Formula 3, wherein in General Formula (1-1) and General Formula (1-2), B is the same, and indicates a point linked to another group or structural unit.

12. The triazine ring-containing polymer of claim 1, comprising a structural unit represented by General Formula (1-3) and a structural unit represented by General Formula (1-4):

$$*-[A-B'-]-* \quad (1\text{-}3)$$

$$*-[A-B''-]-* \quad (1\text{-}4)$$

wherein, in General Formula (1-3) and General Formula (1-4),

A is represented by General Formula 2, wherein in General Formula (1-3) and General Formula (1-4), A is the same, B' and B'' are each independently represented by General Formula (3), wherein in General Formula (1-3) and General Formula (1-4), B' and B'' are different from each other, and indicates a point linked to another group or structural unit.

13. The triazine ring-containing polymer of claim 1, comprising a structural unit represented by General Formula (1-5), a structural unit represented by General Formula (1-6), a structural unit represented by General Formula (1-7), and a structural unit represented by General Formula (1-8):

$$*-[A'-B'-]-* \quad (1\text{-}5)$$

$$*-[A''-B'-]-* \quad (1\text{-}6)$$

$$*-[A'-B''-]-* \quad (1\text{-}7)$$

$$*-[A''-B''-]-* \quad (1\text{-}8)$$

wherein, in General Formulae (1-5), (1-6), (1-7), and (1-8),

A', and A'' are each independently represented by General Formula 2, wherein A' and A'' are different, B and B' are each independently represented by General Formula 3, wherein B' and B'' are different, and indicates a point linked to another group or structural unit.

14. The triazine ring-containing polymer of claim 1, comprising a glass transition temperature of greater than or equal to about 80° C. and less than or equal to about 190° C.

15. The triazine ring-containing polymer of claim 1, wherein the polymer dissolves at a concentration of greater than or equal to about 1 mass % in two or more different of solvents.

16. The triazine ring-containing polymer of claim 1, comprising a refractive index of greater than or equal to about 1.70.

17. A thermoplastic article comprising the triazine ring-containing polymer of claim 1.

18. An optical part comprising the triazine ring-containing polymer of claim 1.

* * * * *